(12) United States Patent
Lee et al.

(10) Patent No.: US 9,853,476 B2
(45) Date of Patent: Dec. 26, 2017

(54) ELECTRONIC DEVICE AND BATTERY CHARGE/DISCHARGE CONTROL METHOD THEREOF

(71) Applicant: Samsung Electronics Co., Ltd., Gyeonggi-do (KR)

(72) Inventors: Kwanho Lee, Seoul (KR); Yongsang Yun, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 81 days.

(21) Appl. No.: 14/939,152

(22) Filed: Nov. 12, 2015

(65) Prior Publication Data

US 2016/0141893 A1    May 19, 2016

(30) Foreign Application Priority Data

Nov. 13, 2014 (KR) .................. 10-2014-0157840

(51) Int. Cl.
*H02J 7/00* (2006.01)
*G06F 1/26* (2006.01)

(52) U.S. Cl.
CPC ............ *H02J 7/007* (2013.01); *G06F 1/26* (2013.01); *H02J 7/0004* (2013.01); *H02J 7/0073* (2013.01); *H02J 7/0047* (2013.01); *H02J 2007/0096* (2013.01)

(58) Field of Classification Search
CPC ... H02J 7/007; H02J 7/0047; H02J 2007/0096
USPC ......................................................... 320/107
See application file for complete search history.

(56) References Cited

U.S. PATENT DOCUMENTS

| 5,789,901 | A  | * | 8/1998  | Lomholt ............ G01R 31/3648 320/134 |
| 6,337,560 | B1 |   | 1/2002  | Kalogeropoulos et al. |
| 6,911,804 | B2 |   | 6/2005  | Mori |
| 8,583,955 | B2 | * | 11/2013 | Lu et al. ............. H04L 12/2807 713/300 |
| 9,184,601 | B2 | * | 11/2015 | Nishibayashi et al. ... H02J 7/00 |
| 9,184,621 | B2 | * | 11/2015 | Lee ........................ H02J 7/1446 |
| 2002/0149346 | A1 | * | 10/2002 | Sakakibara ........... H02J 7/0031 320/162 |

(Continued)

FOREIGN PATENT DOCUMENTS

| EP | 2 595 269 A1 | 5/2013 |
| JP | 2003-9413 A | 1/2003 |

(Continued)

OTHER PUBLICATIONS

European Search Report dated Feb. 23, 2016.
International Search Report dated Feb. 24, 2016.
European Search Report, dated Oct. 25, 2017.

*Primary Examiner* — Sun Lin
(74) *Attorney, Agent, or Firm* — Cha & Reiter, LLC.

(57) ABSTRACT

An electronic device according to various embodiments of the present disclosure includes a rechargeable battery, and at least one processor. The processor generates usage pattern information of the battery based on a charge/discharge state of the battery, and configures charge/discharge information of the battery using the usage pattern information that is used to optimize battery life, operating capability of the battery, or a charge/discharge state that is an optimized tradeoff between such factors.

27 Claims, 13 Drawing Sheets

(56) References Cited

U.S. PATENT DOCUMENTS

| | | | |
|---|---|---|---|
| 2004/0124810 A1 | 7/2004 | Smallwood et al. | |
| 2005/0017683 A1 | 1/2005 | Smallwood et al. | |
| 2005/0134225 A1 | 6/2005 | Mese et al. | |
| 2009/0289603 A1* | 11/2009 | Mahowald | H02J 7/0057 320/151 |
| 2010/0123436 A1 | 5/2010 | Herrod et al. | |
| 2012/0062181 A1 | 3/2012 | Lee et al. | |
| 2012/0280663 A1 | 11/2012 | Lim et al. | |
| 2013/0015860 A1 | 1/2013 | Crombez | |
| 2013/0119942 A1 | 5/2013 | Sutarwala et al. | |
| 2013/0257382 A1 | 10/2013 | Field et al. | |
| 2015/0048796 A1* | 2/2015 | Sherstyuk et al. | H01M 10/425 320/129 |
| 2016/0232736 A1* | 8/2016 | Holtappels et al. | H01M 10/4257 |

FOREIGN PATENT DOCUMENTS

| | | |
|---|---|---|
| KR | 10-2008-0011955 A | 2/2008 |
| KR | 10-2012-0028472 A | 3/2012 |
| KR | 10-2012-0124870 A | 11/2012 |
| KR | 10-1288652 B1 | 7/2013 |
| KR | 10-2014-0117072 A | 10/2014 |

* cited by examiner

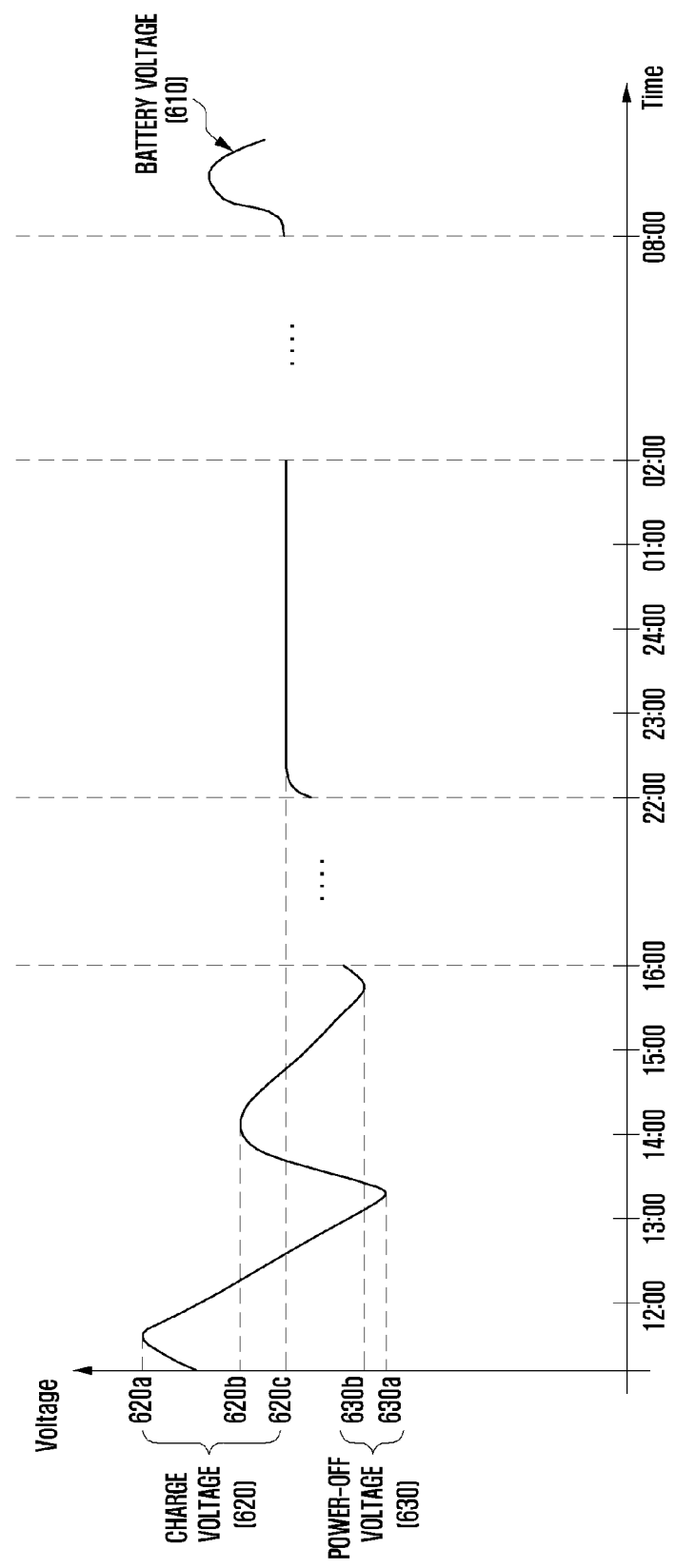

ELECTRONIC DEVICE AND BATTERY CHARGE/DISCHARGE CONTROL METHOD THEREOF

CLAIM OF PRIORITY

This application claims the benefit of priority under 35 U.S.C. §119(a) from Korean Patent Application No. 10-2014-0157840, filed on Nov. 13, 2014, which is hereby incorporated by reference for all purposes as if fully set forth herein.

BACKGROUND

1. Field of the Disclosure

Various embodiments of the present disclosure relate to an electronic device for controlling charge/discharge of a battery, and relate to an electronic device for controlling charge/discharge of a battery by analyzing a battery usage pattern of a user, and a method for controlling charge/discharge of a battery thereof.

2. Description of the Related Art

Electronic devices such as mobile phones, tablets, laptops, MP3 players, digital cameras, and PMPs may provide various functions, such as a communication function, a multimedia function, a game function, and various application functions to the user. The electronic device may receive power through a battery in order to provide various functions as described above. The battery may be coupled to secondary batteries that are reusable after charging.

An electronic device typically operates by fully charging the battery in a uniform manner, regardless of the battery usage history of a user. The higher that the charging voltage of the battery is set, the greater the charging capacity of the battery becomes, and thus the usage time of the electronic device can be increased. Furthermore, the higher that the charging current of the battery is set, the shorter the time required to fully charge the battery. However, the higher the charging voltage or charging current of the battery is set, a number of problems become more likely to occur, such as shortened battery service life and heightened possibility of ignition, e.g. battery explosion due to battery deterioration. Therefore, a need exists to address at least some of the issues associated with battery charging.

SUMMARY

The present disclosure provides an electronic device and a method for controlling the battery charge/discharge of the electronic device, and advantageously provides an electronic device with an extended service life of the battery by providing various battery charge/discharge modes to a user and configuring charge/discharge information on the battery depending on each of the respective charge/discharge modes.

An electronic device according to an embodiment of the present disclosure may include, for example, a rechargeable battery, and at least one processor including hardware such as circuitry configured for operation, wherein the processor may generate usage pattern information of the battery based on the charge/discharge state of the battery and configure the charge/discharge information on the battery using the usage pattern information.

A method for controlling charge/discharge of a battery according to an embodiment of the present disclosure may include: generating usage pattern information of a battery on the basis of a charge/discharge state of the battery; and configuring charge/discharge information of the battery based on the usage pattern information.

A method for controlling charge/discharge of a battery by an electronic device according to various embodiments of the present disclosure enables a user to charge or discharge the battery with a configured threshold value depending on the charge/discharge information of the battery and thus provides an advantageous effect of preventing the deterioration of the battery and extending the battery life.

A method for controlling charge/discharge of a battery by an electronic device, according to various embodiments of the present disclosure, generates usage pattern information of a battery based on a charge/discharge state of the battery, and configures charge/discharge information of the battery based on the generated usage pattern information. Therefore, the method may provide an advantageous effect of preventing the deterioration due to the full charge of the battery and prolonging the battery service life.

BRIEF DESCRIPTION OF THE DRAWINGS

The above features, and advantages of the present disclosure will become more apparent to a person of ordinary skill in the art from the following detailed description in conjunction with the accompanying drawings, in which:

FIG. 4A and FIG. 4B are graphs showing changes in battery voltage based on time according to various embodiments of the present disclosure in which FIG. 4A shows a charge voltage is a threshold voltage value that can be charged to the battery, and the electronic device charges the battery up to the predetermined charge voltage;

FIG. 4B is an example, when the charge current 421 is set to 2 A, and the charge voltage 420 is set to be 4.1 V;

FIG. 6A is a graph showing changes in battery voltage based on time according to various embodiments of the present disclosure;

DETAILED DESCRIPTION

Figure 1:
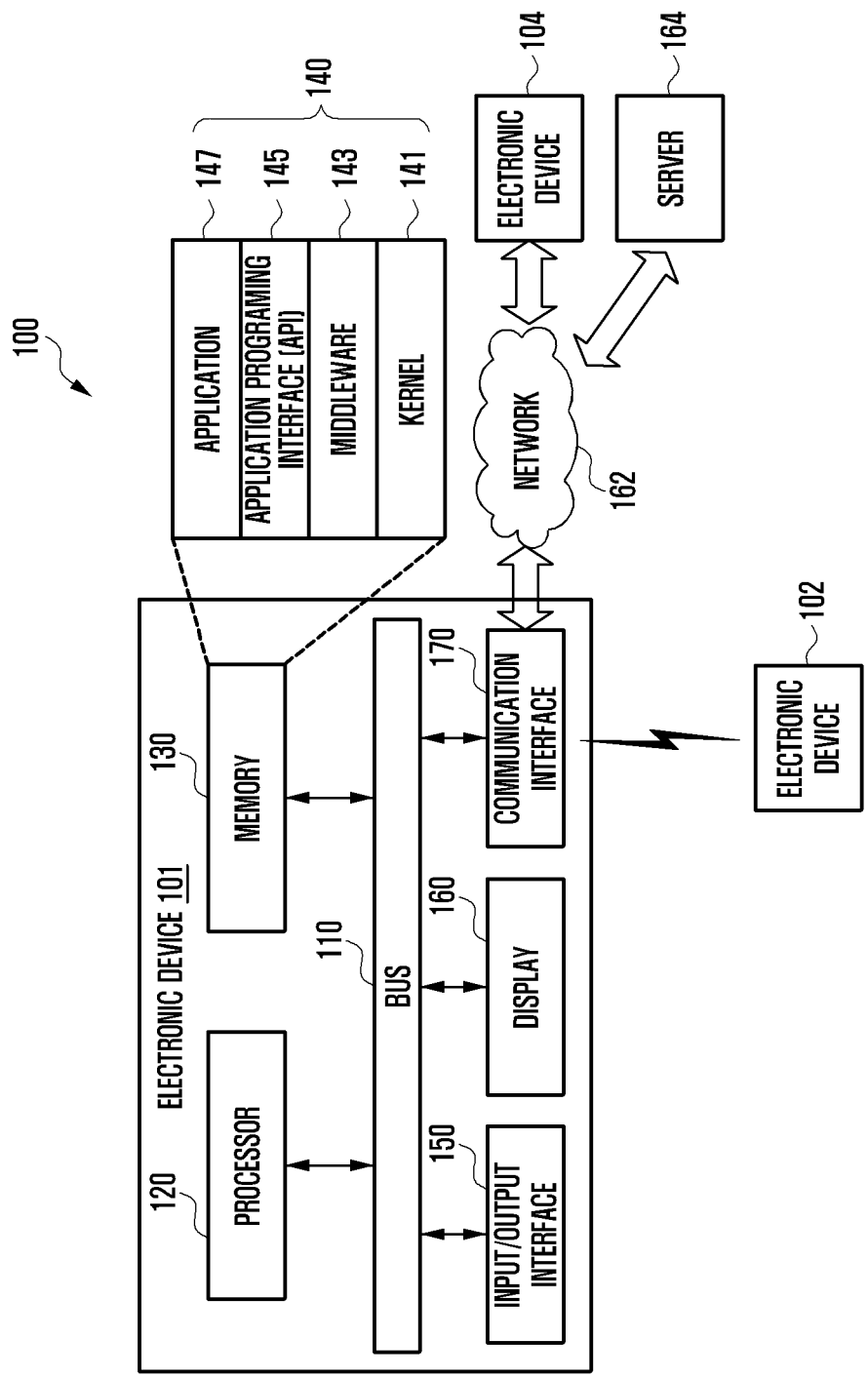
FIG. 1 illustrates a network environment including an electronic device according to various embodiments of the present disclosure.

Hereinafter, exemplary embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as an exemplification of the principles of the disclosure and is not intended to limit the disclosure to the specific embodiments illustrated. The same reference numbers are used throughout the drawings to refer to the same or like parts.

An expression "comprising", "may comprise", "comprises", "comprising" used in the present disclosure indicates presence of a corresponding function, operation, element, presence of a characteristic, numeral, step, operation, element, component, or combination thereof described in a specification and does not limit additional at least one function, operation, element presence of a characteristic, numeral, step, operation, element, component, or combination thereof described in a specification. The present disclosure, an expression "or" includes any combination or the entire combination of together listed words. An expression of a first and a second in the present disclosure may represent various elements of the present disclosure, but does not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" electrically or physically to the other element, or "electrically coupled" to the other element through a third element. However, when it is described that an element is "directly coupled" to another element, no element may exist between the element and the other element.

Terms used in the present disclosure are not to limit the present disclosure but to illustrate exemplary embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch), just to name a few non-limiting possibilities.

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame, just to name a few non-limiting possibilities.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FDR (Flight Data Recorder), a car infotainment device, electronic equipment for ship (e.g., a marine navigation system, a gyrocompass, etc.), avionics, security equipment, or an industrial or home robot, just to name a few non-limiting possibilities.

According to some embodiments, an electronic device may be furniture, or part of a building, or a construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are exemplary only and not to be considered as a limitation of this disclosure, just to name a few non-limiting possibilities.

FIG. 1 is a block diagram 100 illustrating an electronic apparatus according to an embodiment of the present disclosure.

Referring now to FIG. 1, the electronic apparatus 101 may include, for example, a bus 110, a processor 120, a non-transitory memory 130, a user input module 150, a display 160, and a communication interface 170.

The bus 110 may be, for example, a circuit for interconnecting elements described above and for allowing a communication, e.g. by transferring a control message, between the elements described above.

The processor 120, which comprises hardware such as circuitry configured for operation and can be embodied as one or more intergrated circuit can receive commands from the above-mentioned other elements, e.g. the memory 130, the user input module 150, the display 160, and the communication interface 170, through, for example, the bus 110, can decipher the received commands, and perform operations and/or data processing according to the deciphered commands. A microprocessor or controller that includes a processor or microprocessor configured for operation may be considered to comprise the processor. There can be more than one processor, microprocessor or controller in the electronic device.

A processor 120 may be configured to analyze the amount of battery consumption of at least one application running on the electronic device 101 and generate usage pattern information of the battery. The processor 120 may be configured to analyze the number of times of battery charges/discharges and generate the usage pattern information of the battery. The processor 120 may generate the usage pattern information of the battery based on, for example, at least one type of information from among time information and location information. The processor 120 may analyze a state in which the battery continues to be charged to generate the usage pattern information of the battery.

According to various embodiments of the present disclosure, the processor 120 sets the charge/discharge information based on the current battery charge/discharge mode. When the current battery charge/discharge mode is a fully charged/discharged mode, the processor 120 may set the charge voltage of the battery to be a fully charged voltage or set a power-off voltage of the battery to be a fully discharged voltage. The "fully-charged voltage" may refer to the highest voltage that can be charged to a battery set through the electronic device. In addition, the fully discharged voltage may refer to the lowest voltage by which the battery is made to power-off the electronic device. The "charge voltage" refers to a threshold value of a voltage that can be charged to the battery and can be set in the electronic device 101 or an external charging device. The electronic device 101 or the external charging device can charge the battery up to the configured charging voltage. The power-off voltage is the threshold value for maintaining the power of the electronic device, and when the electronic device 201 discharges the battery up to the power-off voltage, the power supply of the electronic device 101 can be terminated.

According to various embodiments, when the battery charge/discharge mode is set to a user configuration mode, the processor 120 may utilize the battery configuration information obtained from the user to configure the charge/discharge information of the battery. The battery configuration information or the battery charge/discharge information may include at least one type (e.g. category) of information from among a charge voltage, a charge current, a charge time, and a power-off voltage.

According to various embodiments, when the battery charge/discharge mode is set to an automatic configuration mode, the processor 120 may be configured to generate usage pattern information of the battery that is based on the charge/discharge state of the battery. The processor 120 may set the charge/discharge information on the battery using the generated usage pattern information.

The memory 130, which a non-transitory memory, can store commands received from the processor 120 and/or other elements, e.g. the user input module 150, the display 160, and the communication interface 170, and/or commands and/or data generated by the processor 120 and/or other elements. The memory 130 may include softwares and/or programs 140, such as a kernel 141, middleware 143, an Application Programming Interface (API) 145, and an application 147. Each of the programming modules described above may be configured by software, firmware, hardware, and/or combinations of two or more thereof and are executed by hardware.

The kernel 141 can control and/or manage system resources, e.g. the bus 110, the processor 120 or the memory 130, used for execution of operations and/or functions implemented in other programming modules, such as the middleware 143, the API 145, and/or the application 147. Further, the kernel 141 can provide an interface through which the middleware 143, the API 145, and/or the application 147 can access and then control and/or manage an individual element of the electronic apparatus 100.

The middleware 143 can perform a relay function which allows the API 145 and/or the application 147 to communicate with and exchange data with the kernel 141. Further, in relation to operation requests received from at least one of an application 147, the middleware 143 can perform load balancing in relation to the operation requests by, for example, giving a priority in using a system resource, e.g. the bus 110, the processor 120, and/or the memory 130, of the electronic apparatus 100 to at least one application from among the at least one of the application 147.

The API 145 is an interface through which the application 147 can control a function provided by the kernel 141 and/or the middleware 143, and may include, for example, at least one interface or function for file control, window control, image processing, and/or character control.

The user input module 150 can receive, for example, a command and/or data from a user, and transfer the received command and/or data to the processor 120 and/or the memory 130 through the bus 110. The display 160 can display an image, a video, and/or data to a user.

The communication interface 170 can establish a communication between the electronic apparatus 100 and another electronic devices 102 and 104 and/or a server 164. The communication interface also includes hardware such as a transmitter, receiver or transceiver, and is coupled to one or more antennas for transmission or reception. The communication interface 170 can support short range communication protocols, e.g. a Wireless Fidelity (WiFi) protocol, a BlueTooth (BT) protocol, and a Near Field Communication (NFC) protocol, communication networks, e.g. Internet, Local Area Network (LAN), Wire Area Network (WAN), a telecommunication network, a cellular network, and a satellite network, or a Plain Old Telephone Service (POTS), or any other similar and/or suitable communication networks, such as network 162, or the like. Each of the electronic devices 102 and 104 may be a same type and/or different types of electronic apparatus.

Figure 2:
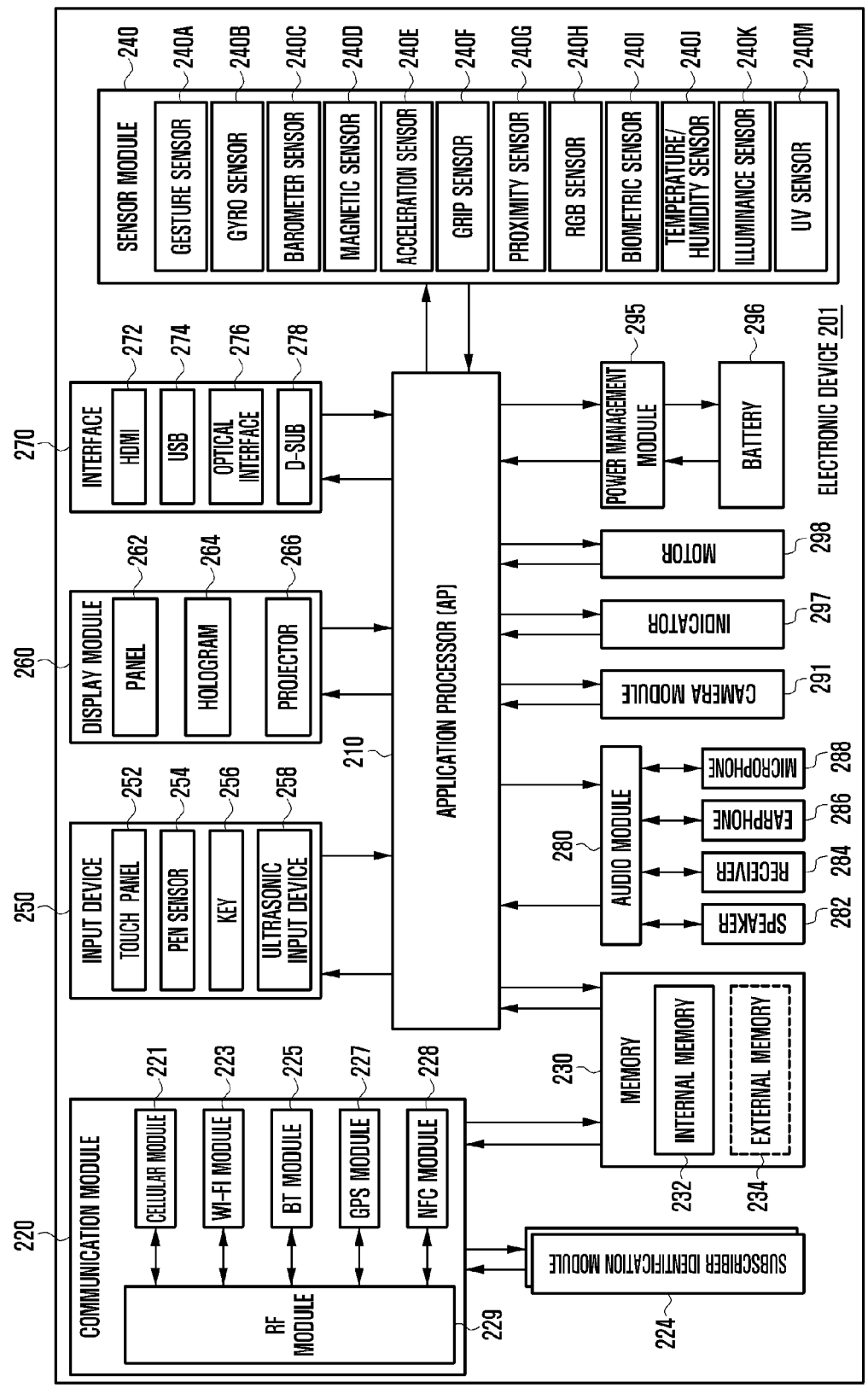
FIG. 2 is a block diagram of an electronic device according to various embodiments of the present disclosure.

FIG. 2 is a block diagram illustrating an electronic device 201 in accordance with an embodiment of the present disclosure. The electronic device 201 may form, for example, a whole or a part of the electronic device 101 shown in FIG. 1. Referring now to FIG. 2, the electronic device 201 may include at least one application processor (AP) 210, a communication module 220, a subscriber identification module (SIM) card 224, a non-statutory memory 230, a sensor module 240, an input unit 250, a display 260, an interface 270, an audio module 280, a camera module 291, a power management module 295, a battery 296, an indicator 297, and a motor 298.

The AP 210 may drive an operating system or applications, control a plurality of hardware or software components connected thereto, and also perform processing and operation for various data including multimedia data. The AP 210 may be formed of system-on-chip (SoC), for example. According to an embodiment, the AP 210 may further include a graphic processing unit (GPU) (not shown).

The processor 210, which includes hardware such as circuitry configured for operation, may generate usage pattern information regarding the battery 296 by analyzing the battery 296 consumption amount of at least one application running on the electronic device 201. The processor 210 may analyze the number of times of battery charging/discharging and generate the usage pattern information of the battery 296. The processor 210 may generate the usage pattern information regarding the battery 296 based on at least one type of information, for example, from among time information and location information. The processor 210 may generate the usage pattern information on the battery 296 by analyzing the state in which the battery continues to be charged. The usage pattern information may include information regarding the charge pattern or the discharge pattern of the battery 296. The method of generating usage pattern information of the battery 296 will now be described with reference to FIG. 5.

According to various embodiments of the present disclosure, the processor 210 may set the charge/discharge information based on the current battery charge/discharge mode. When the battery charge/discharge mode is set to a fully charged/discharged mode, the processor 210 may set the charge voltage of the battery 296 to be at a fully charged voltage or set the power-off voltage of the battery 296 to be at a fully discharged voltage. The fully charged voltage as described herein refers to the highest voltage from among charging voltages that can be set in the electronic device 201. The fully charged voltage refers to the highest voltage that can be charged to the battery 296 set through the electronic device 201. In addition, the fully discharged voltage refers to the lowest voltage from among the power-off voltages that can be set in the electronic device 201. The fully discharged voltage refers to the lowest voltage by which the battery 296 is made to power-off the electronic device. The charge voltage is a threshold value of the voltage that can charge the battery 296 and can be set in the electronic device 201 or in the external charging device. The electronic device 201 or the external charging device can charge the battery up to the predetermined charging voltage. The power-off voltage is the threshold value for maintaining the power of the electronic device, and when the electronic device 201 discharges the battery up to the power-off voltage, the power supply of the electronic device 201 can be terminated.

According to various embodiments of the present disclosure, when the battery charge/discharge mode is set to a user configuration mode, the processor 210 may utilize the battery configuration information obtained from the user and configure the charge/discharge information of the battery 296. The battery configuration information and the battery charge/discharge information may include at least one type of information from among the charge voltage, the charge current, the charge time, and the power-off voltage.

According to various embodiments of the present disclosure, when the battery charge/discharge mode is set to an automatic configuration mode, the processor 210 may generate the usage pattern information of the battery 296 based on the charge/discharge state of the battery 296. The processor 210 may set the charge/discharge information on the battery 296 based on (e.g. in view of) the generated usage pattern information.

With reference to FIG. 2, the communication module 220 (e.g., the communication interface 160) includes hardware such as a transmitter, receiver or transceiver and may perform a data communication with any other electronic device (e.g., the electronic device 104 or the server 164) connected to the electronic device 200 (e.g., the electronic device 101) through the network. According to an embodiment of the invention, the communication module 220 may include therein one or more of a cellular module 221, a WiFi module 223, a BT module 225, a GPS module 227, an NFC module 228, and an RF (Radio Frequency) module 229. All of the aforementioned modules do not constitute software per se and operate via or are executed by hardware.

The cellular module 221 may offer a voice call, a video call, a message service, an internet service, or the like through a communication network (e.g., LTE, LTE-A, CDMA, WCDMA, UMTS, WiBro, or GSM, etc.). Additionally, the cellular module 221 may perform identification and authentication of the electronic device in the communication network, using the SIM card 224. According to an embodiment, the cellular module 221 may perform at least part of the functions that the AP 210 can provide. For example, the cellular module 221 may perform at least part of a multimedia control function.

According to an embodiment, the cellular module 221 may include a communication processor (CP). Additionally, the cellular module 221 may be formed of hardware such as a SoC, for example. Although some elements such as the cellular module 221 (e.g., the CP), the memory 230, or the power management module 295 are shown as separate elements being different from the AP 210 in FIG. 2, the AP 210 may be formed to have at least part (e.g., the cellular module 221) of the above elements in an embodiment.

According to an embodiment, the AP 210 or the cellular module 221 (e.g., the CP) may load commands or data, received from a nonvolatile memory connected thereto or from at least one of the other elements, into a volatile memory to process them. Additionally, the AP 210 or the cellular module 221 may store data, received from or created at one or more of the other elements, in the nonvolatile memory.

Each of the WiFi module 223, the BT module 225, the GPS module 227 and the NFC module 228 may include a hardware processor for processing data transmitted or received therethrough. Although FIG. 2 shows the cellular module 221, the WiFi module 223, the BT module 225, the GPS module 227 and the NFC module 228 as different blocks, at least part of them may be contained in a single IC (Integrated Circuit) chip or a single IC package in an embodiment. For example, at least part (e.g., the CP corresponding to the cellular module 221 and a WiFi processor corresponding to the WiFi module 223) of respective processors corresponding to the cellular module 221, the WiFi module 223, the BT module 225, the GPS module 227 and the NFC module 228 may be formed as a single SoC.

The RF module 229 may transmit and receive data, e.g., RF signals or any other electric signals. Although not shown, the RF module 229 may include a transmitter, receiver, transceiver, a PAM (Power Amp Module), a frequency filter, an LNA (Low Noise Amplifier), or the like. Also, the RF module 229 may include any component such as an antenna, e.g., a wire or a conductor, for transmission of electromagnetic waves in a free air space. Although FIG. 2 shows that the cellular module 221, the WiFi module 223, the BT module 225, the GPS module 227 and the NFC module 228 share the RF module 229, at least one of them may perform transmission and reception of RF signals through a separate RF module in an embodiment.

The SIM card 224_1 to 224_N may be a specific card constituting hardware and formed of SIM, and may be inserted into a slot 225_1 to 225_N formed at a certain place of the electronic device. The SIM card 224_1 to 224N may contain therein an ICCID (Integrated Circuit Card IDentifier) or an IMSI (International Mobile Subscriber Identity).

The non-transitory memory 230 (e.g., the memory 130) may include an internal memory 232 and an external memory 234. The internal memory 232 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.), just to name some non-limiting possibilities.

According to an embodiment, the internal memory 232 may have the form of an SSD (Solid State Drive). The external memory 234 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 234 may be functionally connected to the electronic device 200 through various interfaces. According to an embodiment, the electronic device 200 may further include a storage device or medium such as a hard drive.

According to various embodiments of the present disclosure, a memory 230 may store usage pattern information of the battery 296 generated by the processor that analyzes the battery 296 consumption amount of at least one application running on the electronic device 201. The memory 230 may store the analysis regarding the number of times the battery 296 charging/discharging, and may store the generated usage pattern information of the battery 296. The memory 230 may store the usage pattern information of the battery 296 generated based on at least one among the time information and the location information. The memory 230 may also store the usage pattern information of the battery 296 generated by the processor analyzing the state in which the battery 296 continues to be charged. The memory 230 may store the battery configuration information obtained from the user. The memory 230 may store the battery charge/discharge information. The battery configuration information and the battery charge/discharge information may include at least one charge-related information from among the charge voltage, the charge current, the charge time, and the power-off voltage. In addition, the memory 230 may store the battery capacity and the number of the charge/discharge cycles of the battery.

The sensor module 240, which is comprised of hardware, may measure a physical quantity or sense an operating status of the electronic device 200, and then convert measured or sensed information into electric signals. The sensor module 240 may include, for example, at least one of a gesture sensor 240A, a gyro sensor 240B, an atmospheric sensor 240C, a magnetic sensor 240D, an acceleration sensor 240E, a grip sensor 240F, a proximity sensor 240G, a color sensor 240H (e.g., RGB (Red, Green, Blue) sensor), a biometric sensor 240I, a temperature-humidity sensor 240J, an illumination sensor 240K, and a UV (ultraviolet) sensor 240M. Additionally or alternatively, the sensor module 240 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 240 may include a control circuit for controlling one or more sensors equipped therein.

The input unit 250 may include hardware such as a touch panel 252, a digital pen sensor 254, a key 256, or an ultrasonic input unit 258. The touch panel 252 may recognize a touch input in a manner of capacitive type, resistive type, infrared type, or ultrasonic type. Also, the touch panel 252 may further include a control circuit. In case of a capacitive type, a physical contact or proximity may be recognized. The touch panel 252 may further include a tactile layer. In this case, the touch panel 252 may offer a tactile feedback to a user.

The digital pen sensor 254 may be formed in the same or similar manner as receiving a touch input or by using a separate recognition sheet. The key 256 may include, for example, a physical button, an optical key, or a keypad. The ultrasonic input unit 258 is a specific device capable of identifying data by sensing sound waves with a microphone 288 in the electronic device 200 through an input tool that generates ultrasonic signals, thus allowing wireless recognition. According to an embodiment, the electronic device 200 may receive a user input from any external device (e.g., a computer or a server) connected thereto through the communication module 220.

The display 260 (e.g., the display 150) may include a panel 262, a hologram 264, or a projector 266. The panel 262 may be, for example, an LCD (Liquid Crystal Display), AM-OLED (Active Matrix Organic Light Emitting Diode), or the like, just to name some non-limiting possibilities. The panel 262 may have a flexible, transparent or wearable form. The panel 262 may be formed of a single module with the touch panel 252. The hologram 264 may show a stereoscopic image in the air using interference of light. The projector 266 may project an image onto a screen, which may be located at the inside or outside of the electronic device 200. According to an embodiment, the display 260 may further include a control circuit for controlling the panel 262, the hologram 264, and the projector 266.

According to various embodiments of the present disclosure, the electronic device 201 may display the type of the battery charge/discharge mode to the user via the display 260. The type of the battery charge/discharge mode may include display a list that includes a fully charged/discharged mode, a user configuration mode, and an automatic configuration mode, and an indication as to which mode is the currently selected mode. The fully charged/discharged mode may be a mode for setting the charge voltage as the fully charged voltage or a mode for setting a power-off voltage of the battery 296 as the fully discharged voltage. The user configuration mode may be a mode for setting the battery charge/discharge information for the charge voltage or the power-off voltage of the electronic device 201 using the battery configuration information obtained from the user. The automatic configuration mode may be a mode for setting the charging and discharging information on the battery using the usage pattern information of the battery 296. The electronic device 201 may display the charge state or the discharge state of the battery via a display 260.

The interface 270 may include, for example, hardware such as an HDMI (High-Definition Multimedia Interface) 272, a USB (Universal Serial Bus) 274, an optical interface 276, or a D-sub (D-subminiature) 278. The interface 270 may be contained, for example, in the communication interface 160 shown in FIG. 1. Additionally or alternatively, the interface 270 may include, for example, an MHL (Mobile High-definition Link) interface, an SD (Secure Digital) card/MMC (Multi-Media Card) interface, or an IrDA (Infrared Data Association) interface.

The audio module 280 may perform a conversion between sounds and electric signals. At least part of the audio module 280 may be contained, for example, in the input/output interface 140 shown in FIG. 1. The audio module 280 may process sound information inputted or outputted through a speaker 282, a receiver 284, an earphone 286, or a microphone 288, via hardware such as an audio processor.

The camera module 291 includes hardware configured to obtain still images and moving images. According to an embodiment, the camera module 291 may include at least one image sensor (e.g., a front sensor or a rear sensor), a lens (not shown), an ISP (Image Signal Processor, not shown), or a flash (e.g., LED or xenon lamp, not shown).

The power management module 295 may manage, for example, the power distribution and usage of the electronic device 201. According to an embodiment of the present disclosure, the power management module 295 may include a Power Management Integrated Circuit (PMIC), a charger IC, or a battery or fuel gauge. The PMIC may use a wired and/or wireless charging method. Examples of the wireless charging method may include, for example, a magnetic resonance method, a magnetic induction method, an electromagnetic method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery and/or a solar battery, just to name some non-limiting possibilities.

The battery gauge may measure the residual amount of the battery 296 and a voltage, current or temperature in a charging process. The battery 296 may store or create electric power therein and supply electric power to the electronic device 200. The battery 296 may be, for example, a rechargeable battery or a solar battery.

The power management module 295 according to various embodiments of the present disclosure may be included in the processor 210, or can be external to the processor. In the case where the power management module is included in the processor configuration, the processor 210 may perform functions of the power management module 295.

The indicator 297 may show thereon a current status (e.g., a booting status, a message status, or a recharging status) of the electronic device 200 or of its part (e.g., the AP 210). The motor 298 may convert an electric signal into a mechanical vibration. Although not shown, the electronic device 200 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more hardware components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in this disclosure may refer to a certain unit that includes one of hardware, software and firmware that is loaded into hardware for execution or a combination thereof. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Figure 3A:
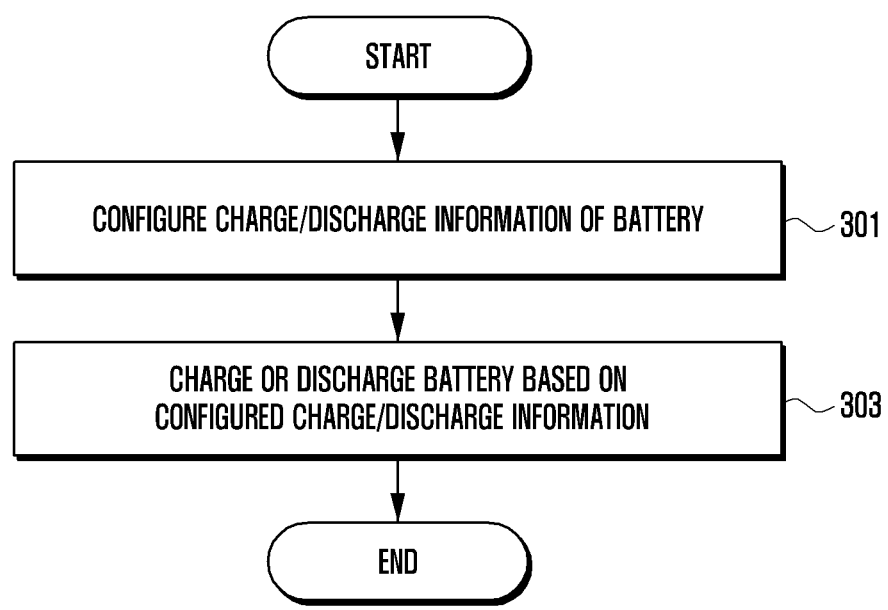
FIG. 3A is a flow chart showing an exemplary operation of setting the charge/discharge information by an electronic device according to various embodiments of the present disclosure.

FIG. 3A is a flow chart showing an exemplary operation of setting the charge/discharge information by an electronic device 201 according to various embodiments of the present disclosure.

The electronic device 201, in operation 301, may set the charge/discharge information on the battery 296. The battery charge/discharge information may include at least one among a charge voltage, a charge current, a charge time, and a power-off voltage. The electronic device 201 may set the charge/discharge information using the configuration information on the battery obtained from the user. The electronic device 201 may set the charge/discharge information on the battery 296, for example, using the usage pattern information of the battery 296. When the battery charge/discharge mode is the fully charged/discharged mode, the electronic device 201 may set the charge voltage to be a fully charged voltage or set a power-off voltage to be a fully discharged voltage.

When the battery charge/discharge mode is a user configuration mode, the electronic device 201 may acquire the battery configuration information from the user via an input device 250. The electronic device 201 may set the charge/discharge information on the battery using the battery configuration information obtained from the user. The battery configuration information may include data from at least one item selected from among a charge voltage, a charge current, a charge time, and a power-off voltage. For example, when a charge voltage of 4.2V is input from the user, the electronic device 201 may set the charge voltage of the battery 296 to be 4.2V. For example, when the power-off voltage of 3.7V is input from the user, the electronic device 201 may set the power-off voltage of the battery 296 to be 3.7V. For example, when a charge current of 1.8 A is input from the user, the electronic device 201 may set the charge current of the battery 296 to be 1.8 A.

When the battery charge/discharge mode is set to an automatic configuration mode, the electronic device 201 may set the charge/discharge information on the battery 296 using the usage pattern information on the battery 296. For example, when a user uses the fully charged battery 296 of 4.3V every lunch time, the electronic device 201 may detect the charge/discharge state of the battery 296 and identify the pattern in which the battery voltage of about 4.1V is used every lunch time. In other words, the electronic device 201 can deduce that the battery voltage of 4.1V is required for the user at lunchtime rather than the fully charged voltage of 4.3 V. The electronic device 201 may set the charge voltage of the battery 296 to be 4.1V to 4.15V using the usage pattern information. For another example, when a user uses about 3.9V of the battery voltage on weekdays and uses about 4.1 V of battery voltage on weekends, the electronic device 201 may set the charge voltage of the battery 296 to be 3.9 V to 3.95 V on weekdays and set the charge voltage of the battery 296 to be 4.1 V to 4.15 V on weekends using the usage pattern information.

The electronic device 201 may charge or discharge the battery based on the set battery charge/discharge information in an operation 303. When the battery charge/discharge mode is the fully charged/discharged mode, the electronic device 201 may charge the battery 296 up to the fully charged voltage and discharge the battery 296 up to the fully discharged voltage. For example, when the charge voltage is set to the fully charged voltage of 4.3V, the electronic device 201 may charge the battery 296 up to 4.3V. When the battery charge/discharge mode is a user configuration mode, the electronic device 201 may charge or discharge the battery 296 based on the charge/discharge information obtained from the user. For example, when the user sets the charge voltage as 4.1 V, the electronic device 201 may charge the battery 296 only up to 4.1 V. For another example, when the user sets the power-off voltage as 3.7 V, the electronic device 201 may discharge the battery 296 only up to 3.7 V. When the battery charge/discharge mode is an automatic configuration mode, the electronic device 201 may charge or discharge the battery 296 based on the battery charge/discharge information configured using the usage pattern information on the battery 296. For still another example, it is assumed that the fully charged voltage of the battery is 4.3V. When the user has the discharge pattern of consuming 1000 mAh of the battery capacity, the electronic device 201 may set the charge voltage to be a voltage (for example, 4.15V, and see Table 1) lower than the fully charged voltage of 4.3 V. The electronic device 201 may charge the battery 296 with the configured charging voltage.

Figure 3B:
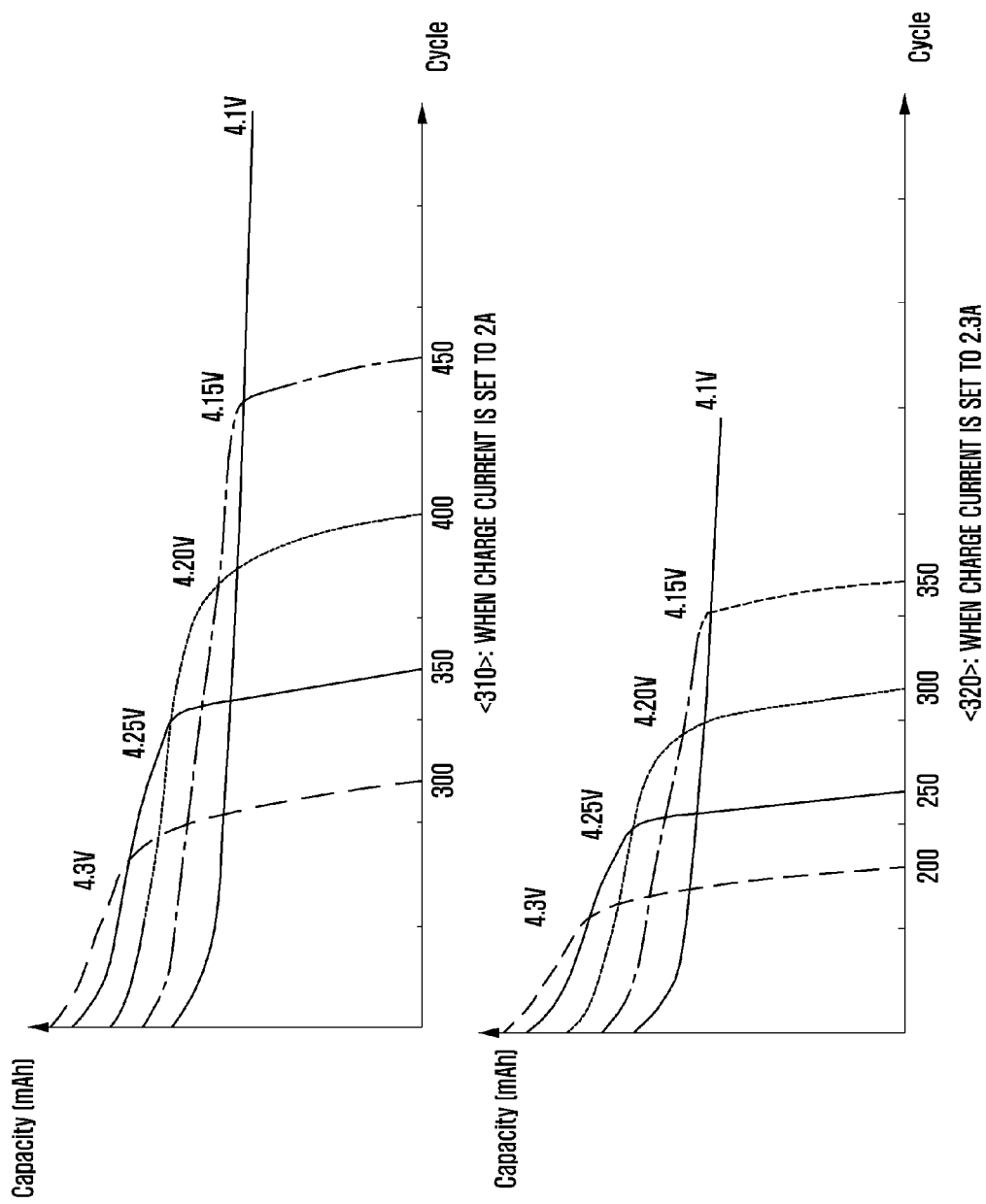
FIG. 3B is a graph showing the number of battery charge/discharge cycles depending on the battery charging voltage according to various embodiments of the present disclosure.

FIG. 3B is a graph showing the number of battery charge/discharge cycles depending on the battery charging voltage according to various embodiments of the present disclosure.

Referring to the graph <310> of FIG. 3B, when using the electronic device 201 under the same conditions, the battery capacity or the number of battery charge/discharge cycles of the battery can be different depending on the charge level of the battery voltage. For example, as shown in the following Table 1, when assuming that the battery voltage is charged with a charge current of 2 amperes up to 4.3 V each time, a battery 296 may have a battery capacity of 1500 mAh, and may be charged up to the maximum 300 times. Further, when assuming that the battery voltage is charged up to 4.2 V with charging current of 2 amperes each time, the battery 296 may have a battery charge capacity of 1300 mAh and be charged up to the maximum 400 times. The larger the battery capacity is, the more the available time of the battery 296 can be increased. The numerical values set forth in Table 1 below are arbitrarily set values in order to help a clear understanding of the disclosure, however actual values may be different.

TABLE 1

| Battery voltage | Battery capacity | The number of battery charge/discharge cycles |
| --- | --- | --- |
| 4.3 V | 1500 mAh | 300 times |
| 4.25 V | 1400 mAh | 350 times |
| 4.2 V | 1300 mAh | 400 times |
| 4.15 V | 1200 mAh | 450 times |

That is, referring to Table 1 above, it can be seen that the higher the voltage charged at the battery 296 under the same conditions becomes, the more the battery capacity increases. On the other hand, it can be seen that as the voltage charged to the battery 296 becomes higher, the number of battery charge/discharge cycles gradually decreases. This can happen because as the charge voltage of the battery 296 is set to be higher, oxidation and reduction reaction occurs more aggressively inside the battery and thus the deterioration phenomenon of the battery becomes worse. Thus, battery life is extended at the tradeoff of reduced capacity, and vice versa.

Referring to the graph <320> of FIG. 3B, the charge time of the battery 296 or the number of charge/discharge cycles of the battery 296 may be different depending on the charge current flowing into the battery 296. For example, as shown in the following Table 2, when assuming that the battery voltage is charged with a charge current of 2 amperes up to 4.3V each time, the battery 296 can be charged up to 300 times and takes two hours to charge. When assuming that the battery voltage is charged with a charge current of 2.3 amperes up to 4.3V each time, the battery 296 can be charged up to 200 times and takes 1.6 hours to charge. When assuming that the battery voltage is charged with a charge current of 2 amperes up to 4.2 V each time, the battery 296 can be charged up to 400 times and takes 1.6 hours to charge. When assuming that the battery voltage is charged with a charge current of 2.3 amperes up to 4.2V each time, the battery 296 can be charged up to 300 times and take 1.2 hours to charge. The numerical values set forth in Table 2 below are arbitrarily set values in order to help a clear understanding of the disclosure and the actual values may be different. Accordingly, the tables do not in any way serve to limit the appended claims.

TABLE 2

| Battery voltage | The number of battery charge/discharge cycles | | Battery charge time | |
| --- | --- | --- | --- | --- |
| | 2 A | 2.3 A | 2 A | 2.3 A |
| 4.3 V | 300 times | 200 times | 2.0 hours | 1.6 hours |
| 4.25 V | 350 times | 250 times | 1.8 hours | 1.4 hours |
| 4.2 V | 400 times | 300 times | 1.6 hours | 1.2 hours |
| 4.15 V | 450 times | 350 times | 1.4 hours | 1.0 hour |

In other words, referring to Table 2 above, when assuming that the battery is charged up to the same voltage, it can be seen that as the charge current of the battery 296 becomes higher, the number of the charge/discharge cycles of the battery 296 becomes lower. Further, it can be seen that as the charge current of the battery 296 becomes higher, the time taken to charge the battery 296 becomes lower.

According to various embodiments of the present disclosure, the electronic device 201 may store the contents of the configuration information described in the tables above in the non-transitory memory 230. For example, the electronic device 201 may store a battery capacity, the number of the charge/discharge cycles of the battery, the battery charge/discharge time, etc. in the memory 230.

According to various embodiments of the present disclosure, the electronic device 201 may identify the number of the charge/discharge cycles of the battery 296 based on the charge time or discharge time of the battery 296. For example, if it takes 2 hours to charge the battery 296 from a power-off voltage to the charge voltage, the electronic device 201 may calculate the number of times of the battery 296 charging, which is charged for a predetermined time (for example, 1 hour 30 minutes) or more, as one time each. Further, if it takes 5 hours to discharge the battery 296 from the charge voltage to a power-off voltage, the electronic device 201 may calculate the number of times of the battery 296 discharging, which is discharged for a predetermined time (for example, 4 hour 30 minutes) or more, as one time each.

According to various embodiments, the number of the charge/discharge cycles of the battery can be checked through a battery voltage change state of the battery 296. For example, the amount of increase in the battery voltage can be checked. When a gained amount of a voltage is greater than or equal to a predetermined amount (for example, 0.6V voltage drop), the number of times of battery charging can be calculated as one time each. Further, the number of times of battery discharging can be checked through the battery voltage drop.

According to various embodiments of the present disclosure, the electronic device 201 may change the charge voltage configured based on the checked charging and discharging number. For example, a battery capable of being charged/discharged about 200 times may have the characteristics of a charge current 2.3 A and a battery charging voltage 4.3V. Accordingly, the electronic device 201 may check the number of times of battery charging and discharging, and calculate the user's battery charge/discharge information, and then may reduce the charge current to 2 A and the charge voltage of the battery to 4.25V.

Figure 4A:
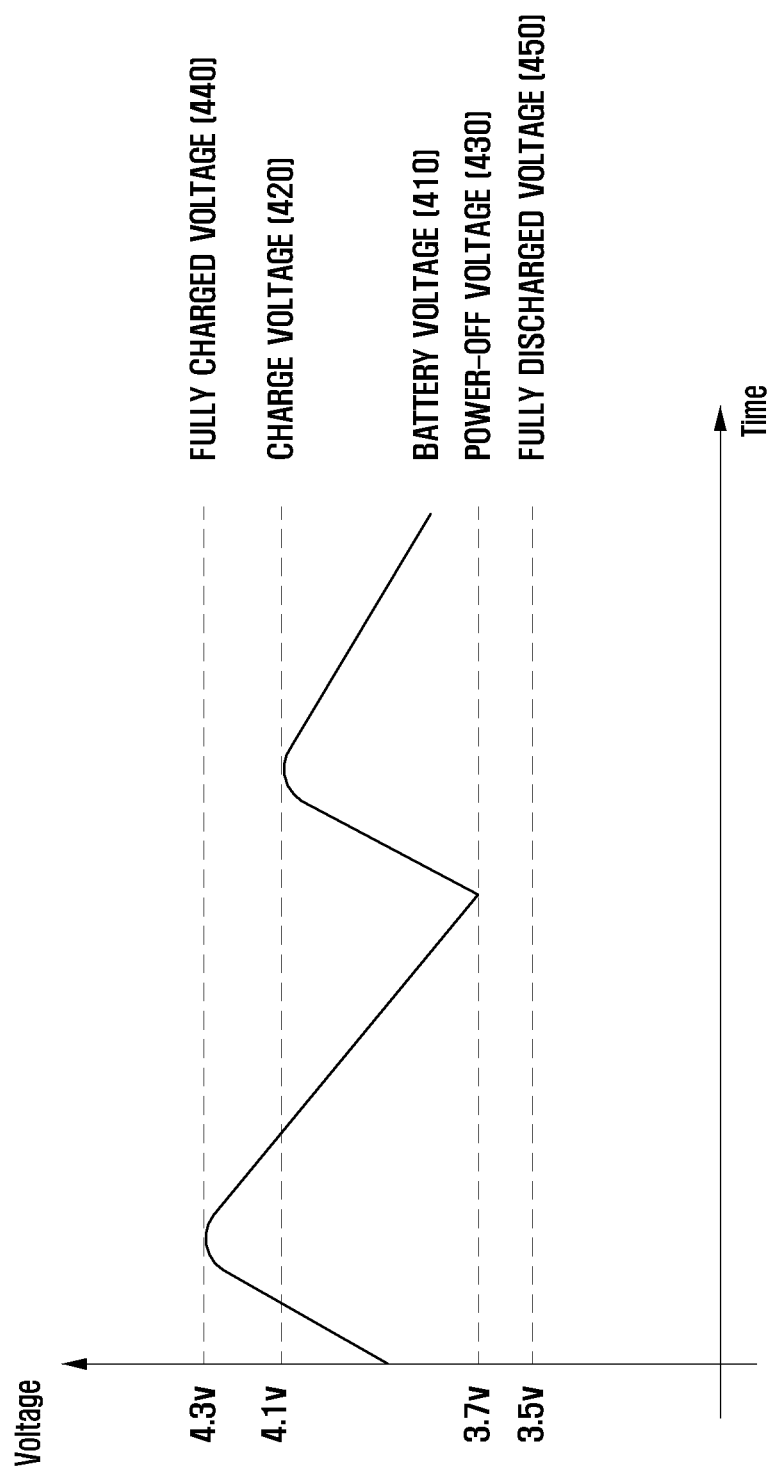
Figure 4B:
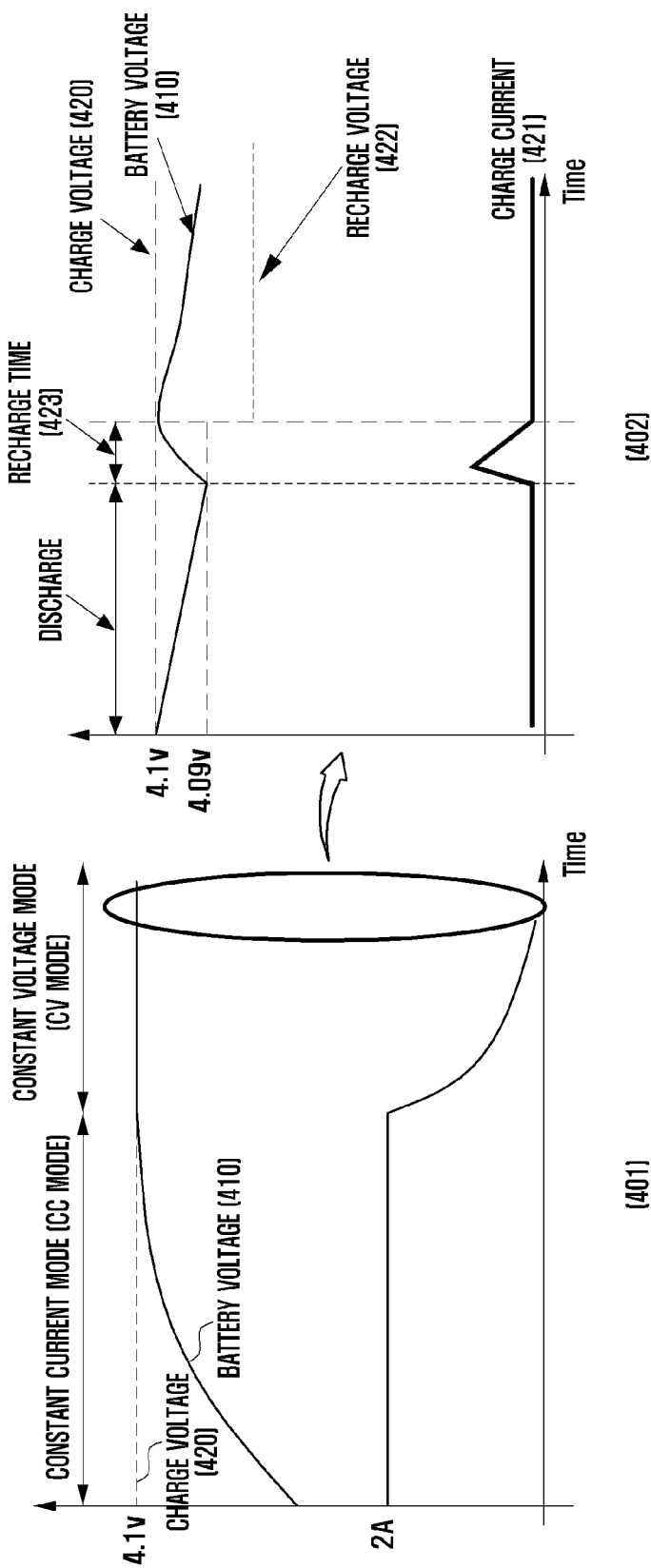

FIG. 4A and FIG. 4B are graphs showing changes in the battery voltage 410 based on time according to various embodiments of the present disclosure.

Referring now to FIG. 4A, the electronic device 201 may set the charge voltage 420. The charge voltage 420 is a threshold voltage value that can be charged to the battery, and the electronic device 201 may charge the battery up to the predetermined charge voltage 420. The electronic device 201 can set the charge voltage 420 to a fully charged voltage 440. When the charge voltage of the battery 296 is set to the fully charged voltage 440, the electronic device 201 may charge the battery 296 up to a predetermined charging voltage (a fully charged voltage 440). When the battery 296 is charged up to the fully charged voltage 440, a display 260 may display a 100% state of the battery. For example, when the charge voltage 420 of the electronic device 201 is set to the fully charged voltage 420 of 4.3V, the electronic device 201 may charge the battery voltage 410 up to 4.3V and display the 100% battery state on the display 260.

According to various embodiments of the present disclosure, the electronic device 201 may set the charge voltage 420 using the battery configuration information and the usage pattern information on the battery 296. The electronic device 201 may charge the battery 296 up to the configured charge voltage 420. When the battery 296 is charged up to the charge voltage 420, a display 260 may display the 100% state of the battery. For example, the electronic device 201 acquires battery setting information of 4.1 V from the user and the charge voltage 420 is set to be 4.1 V, the electronic device 201 may charge the battery voltage 210 up to 4.1 V, display on the display 260 the state of the battery at the corresponding ratio (the ratio when viewing the fully charged voltage as 100%), or display a 100% state of the charge voltage 420. Depending on the state of the charge voltage, colors of battery information or different icons can be added to display on the display.

According to various embodiments of the present disclosure, the electronic device 201 may set the power-off voltage 430, which in the example in FIG. 4A is 3.7 volts. The power-off voltage 430 is the threshold voltage that can be discharged by the battery. When the electronic device 201 discharges the battery 296 up to the power-off voltage 430, the power supply of the electronic device can be terminated.

For example, the power-off voltage 430 of the battery 296 may be set to be 3.7V. The electronic device 201 may set the power-off voltage 430 to the fully discharged voltage 450. When the power-off voltage 430 of the battery 296 is set to the fully discharged voltage 450, the electronic device 201 may discharge the battery 296 up to the configured power-off voltage (fully discharged voltage 450). When the battery 296 is discharged up to the fully discharged voltage 450, the display 260 may display a 0% state of the battery. For example, when the power-off voltage 430 of the electronic device 201 is set to the fully discharged voltage 450 of 3.5 V, the electronic device 201 may display the 0% battery state on the display 260 after consuming the battery voltage 410 up to 3.5 V.

According to various embodiments of the present disclosure, the electronic device 201 may set the power-off voltage 430 using the battery configuration information and the usage pattern information on the battery 296. The electronic device 201 may discharge the battery 296 up to the configured power-off voltage 430. When the battery 296 is discharged up to the power-off voltage 430, the display 260 may display the state of the battery as 0%. For example, the electronic device 201 may acquire battery setting information of 3.7 V from the user and the power-off voltage 430 is set to be 3.7 V, the electronic device 201 may consume the battery voltage 210 up to 3.7 V, display on the display 260 the state of the battery at the corresponding ratio (the ratio when viewing the fully charged voltage as 100%), or display a 0% state of the power-off voltage 430.

According to various embodiments of the present disclosure, the electronic device 201 may charge the battery 296 at a constant current mode (CC mode) and a constant voltage mode (CV mode). The electronic device 201 may charge the battery voltage 410 with a constant charge current 421 up to the charge voltage 420 at a constant current mode.

Referring now to <401> of FIG. 4B, for example, when the charge current 421 is set to 2 A, and the charge voltage 420 is set to be 4.1V, the electronic device 201 may input the 2 A current to the battery 296 up to a time at which the battery voltage 410 becomes near 4.1V. When the battery voltage 410 reaches the vicinity of the charge voltage 420, the electronic device 201 may maintain the battery voltage 410 constantly in the constant voltage mode. For example, when the battery voltage 410 is charged with the charge voltage 420 of 4.1V using the charge current 421 of 2 A, the electronic device 201 can operate in the constant voltage mode that reduces the charge current 421 input to the battery 296 and maintains the battery voltage 410 at 4.1 V.

When the electronic device 201 is connected to a portable (external) charger even after the battery voltage 410 has reached the charge voltage 420, the electronic device 201 operates in the constant voltage mode and thus enabling the fully charged state to continue. The fully charged state of the battery 296 refers to a state in which the battery voltage 410 has reached the charge voltage 420. The state in which the battery 296 continues to be charged means a state in which the electronic device 201 is connected to a portable (external) charger and the charging of the battery 296 is continued. For the fully charged state to be continued, the electronic device 201 may repeatedly recharge the battery voltage 410 up to the charge voltage 420. For example, referring to <402> of FIG. 4B, when the electronic device 201 is connected to the portable charger even after the battery voltage 410 has reached the charge voltage 420 of 4.1 V, the electronic device 201 may maintain the battery 296 at a constant voltage range. In this case, the battery voltage 410 can be reduced up to a predetermined voltage. In the above example, when a predetermined voltage is 4.09V and the battery voltage 410 has reached the charge voltage 420 of 4.1 V, and then decreases to 4.09V, at which level the electronic device 201 may re-charge the battery 296. Accordingly, the battery voltage 410 can be charged up to the charge voltage 420 of 4.1 V. The electronic device 201 may set a recharge time 423 corresponding to the time at which the battery 296 is recharged from a predetermined voltage to the charge voltage 420 or a recharging voltage 422. The electronic device 201, in the state in which the fully charged state continues after having reached at the charge voltage 420, may repeat the cycle in which the battery 296 is recharged during the recharge time 423, the battery voltage 410 is discharged from the charge voltage 420 to a predetermined voltage, and then the battery 296 is recharged.

The electronic device 201 according to various embodiments of the present disclosure may reset the charge voltage 420 of the battery 296 when the battery voltage 410 has reached at the charge voltage 420 and the fully charged state of the battery 296 continues a predetermined time or more. For example, the electronic device 201 may reset 422 the charge voltage 420 to 4.1 V or less when the battery voltage 410 reaches the charge voltage 420 of 4.1 V and the fully charged state continues for longer than a predetermined time. In this case, the electronic device 201 may charge the battery voltage 410 up to the reconfigured charge voltage 422 that is the recharging voltage 422.

Figure 5:
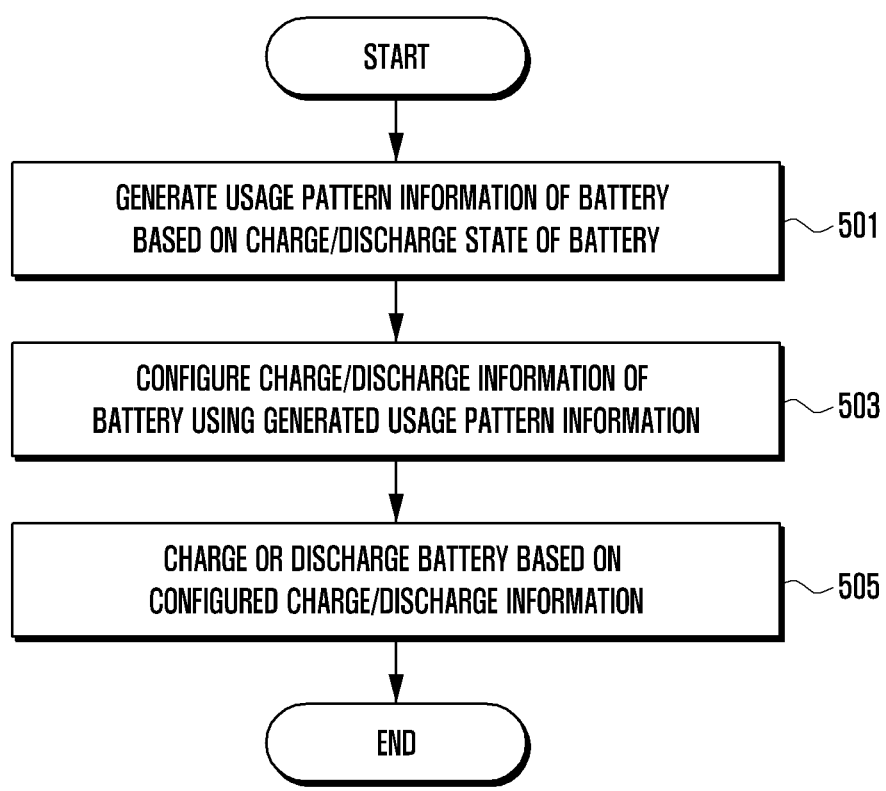
FIG. 5 is a flow chart showing an exemplary operation of setting charge/discharge information using usage pattern information of a battery by an electronic device according to various embodiments of the present disclosure.

FIG. 5 is a flow chart showing an exemplary operation of setting charge/discharge information of the battery 296 using the usage pattern information on the battery 296 by an electronic device 201 according to various embodiments of the present disclosure.

The electronic device 201, in operation 501, may detect the charge/discharge state on the battery 296. The electronic device 201 may generate usage pattern information of the battery 296 based on the charge/discharge state of the battery 296. The usage pattern information may include information on the charge pattern or the discharge pattern of the battery 296.

According to various embodiments of the present disclosure, the electronic device 201 may detect the charge/discharge state of the battery 296 and may analyze the consumption amount of the battery 296 of at least one application. The electronic device 201 may generate usage pattern information of the battery 296 using the analysis result. The electronic device 201 may know function information executed in applications or the electronic device 201 through user log information. The electronic device 201 may know the time period at which at least one application is executed, and analyze the consumption amount of the battery 296 due to the application execution. That is, the electronic device 201 may generate usage pattern information of the battery 296 by analyzing how much of the battery 296 is consumed, in which time zone, and by what kind of application.

According to various embodiments of the present disclosure, the electronic device 201 may detect the charge/discharge state of the battery 296 and analyze the number of times of the battery 296 charging/discharging. The electronic device 201 may generate usage pattern information of the battery 296 using the analysis result. The number of times of the battery 296 charging/discharging may include the number of times of the battery 296 charging and the number of times of the battery 296 discharging. The number of times of the battery 296 charging/discharging may include the number of times by which the battery 296 is fully charged up to the charge voltage and then fully discharged up to the power-off voltage. Otherwise, the number of times battery charging/discharging can be calculated based on the battery charge time and battery usage time. The number of times of the battery 296 charging/discharging can be accumulatively calculated from a time point of purchasing the battery 296 for the first time. The electronic device 201 may know the total number of times of the battery 296 charging/discharging until now. For example, when the number of times of the battery 296 charging/discharging is 100 times, from the time point of purchasing the battery 296 to a certain time point, the electronic device 201 may detect the charge/discharge state of the battery 296 and know that the number of times of the battery 296 charging/discharging is 100 times. That is, the electronic device 201 may generate usage pattern information of the battery 296 of which the number of times of the battery 296 charging/discharging is 100 times.

According to various embodiments of the present disclosure, the electronic device 201 may identify the number of times of the battery 296 charging/discharging based on the charge time or discharge time of the battery 296. For example, if it takes 2 hours to charge the battery 296 from a power-off voltage to the charge voltage, the electronic device 201 may calculate the number of times of the battery 296, charging for a predetermined time (for example, 1 hour 30 minutes) or more, as one time each. Further, if it takes 5 hours to discharge the battery 296 from the charge voltage to the power-off voltage, the electronic device 201 may calculate the number of times of the battery 296 discharging, in which the battery 296 is discharged for a predetermined time (for example, 4 hour 30 minutes) or more, as one time each. According to various embodiments, the number of charge/discharge cycles of the battery can be checked through a battery voltage change state of the battery 296. For example, the amount of gain in the battery voltage can be checked. When the gain amount of a voltage is greater than or equal to a predetermined amount (for example, 0.6 V voltage drop), the number of times of battery charging can be calculated as one time each. Further, the number of times of battery discharging can be checked through the battery voltage drop.

According to various embodiments of the present disclosure, the electronic device 201 may detect the charge/discharge state of the battery 296 based on at least one among time information and location information. The electronic device 201 may generate usage pattern information of the battery 296 based on the charge/discharge state of the battery 296. A method for detecting the charge/discharge state of the battery 296, based on the time information, may include a method for detecting the charge/discharge state of the battery 296 by each time zone or day of the week. For example, when the user consumes the battery voltage 410 using the electronic device 201 at a specific time period, the electronic device 201 may detect the charge/discharge state of the battery 296 at the time period and generate usage pattern information of the battery 296. A method for detecting the charge/discharge state of the battery 296 on the basis of the location information may include the method for identifying a position in which the battery 296 is mainly charged or the position in which the battery 296 is mainly discharged and detecting the charge/discharge state of the battery 296 at the position. For example, when a user resides in region A, the electronic device 201 may detect the charge/discharge state of the battery voltage 410 which changes in region A and generate the usage pattern information of the battery 296.

According to various embodiments of the present disclosure, the electronic device 201 may detect the charge/discharge state of the battery 296 and analyze the state in which the battery 296 continues to be charged. The electronic device 201 may generate usage pattern information of the battery 296 using the analysis result.

For example, when the electronic device 201 is connected to a travel (external) charger even after the battery voltage 410 has reached the charge voltage 420, the electronic device 201 may analyze the state in which the battery 296 continues to be charged and generate usage pattern information of the battery 296. If the user is sleeping about 8 hours while the electronic device 201 is connected to the charger, the electronic device 201 may analyze the state in which the battery continues to be charged, the re-charge time, the number of times of battery recharging, a variation amount of the battery voltage. The electronic device 201 may configure the charge/discharge information of the battery 296 using the generated usage pattern in operation 503. The electronic device 201 may configure the charge/discharge information according to each piece of the usage pattern information of the battery 296. The battery charge/discharge information may include at least one among a charge voltage, a charge current, charge time, and a power-off voltage. According to various embodiments of the present disclosure, an electronic device 101 may analyze the number of times of battery charging/discharging and configure the charge/discharge information of the battery 296 using the generated usage pattern information. The number of times of the battery 296 charging/discharging may include the number of times of the battery 296 charging and the number of times by which the battery 296 is discharged. The number of times of the battery 296 charging/discharging may include the number of times by which the battery 296 is fully charged up to the charge voltage and then fully discharged up to the power-off voltage. The number of times of the battery 296 charging/discharging can be accumulatively calculated from a time point of purchasing the battery 296 for the first time.

According to various embodiments, the number of times of the battery 296 charging/discharging can be calculated based on the charging and discharging capacity of the battery 296. For example, when the battery capacity at a specific time point is calculated as 1500 mAh through the charge current and time, the electronic device 201 may know that the number of times of the battery 296 charging/discharging has reached 100 times corresponding to the battery capacity. The electronic device 101 may analyze the number of times of battery charging/discharging and generate the usage pattern information of the battery 296, and may configure the charge/discharge information of the battery 296 using the generated usage pattern information. According to various embodiments of the present disclosure, the charge/discharge information of the battery 296 can be configured by using the usage pattern information generated based on at least one among time information and location information. The electronic device 201 may configure the charge/discharge information of the battery 296 using the usage pattern information generated based on the time information. For example, when the battery 296 which is fully charged with 4.3 V has a pattern of using about 4.1 V every lunch time, the electronic device 201 may know that the user requires the battery voltage of 4.1 V rather than the fully charged voltage of 4.3 V at lunch time. The electronic device 201 may set the charge voltage of the battery 296 to be 4.1 V to 4.15 V using the usage pattern information. In another example, when the battery 296 fully charged with 4.3 V has a usage pattern in which about 3.9 V of the battery is used on weekdays and about 4.1 V is used on the weekends, it is possible to know that the battery voltage 410 of 3.9 V on weekdays and the battery voltage 410 of 4.1 V on weekends is necessary for the electronic device 201. The electronic device 201 may set, using the usage pattern information, the charge voltage 420 of the battery 296 to be 3.9 V to 3.95 V on weekdays and set the charge voltage 420 of the battery 296 to be 4.1 V to 4.15 V on weekends. The electronic device 201 may configure the charge/discharge information of the battery 296 using the usage pattern information generated based on the location information. For example, when the user has the discharge pattern of consuming 1000 mAh of the battery capacity in the residential area, the electronic device 201 may set the charge voltage to be a voltage (for example, 4.15 V, see Table 1) lower than the fully charged voltage (for example, 4.3 V). When the user has a discharge pattern of consuming 1400 mAh while near the workplace, the electronic device 201 may charge the battery 296 by changing and setting the charge voltage (e.g., 4.3 V).

According to various embodiments of the present disclosure, the electronic device 101 may analyze a state in which the battery continues to be charged and set the charge/discharge information of the battery 296 using the generated usage pattern information. When having a pattern in which the fully charged state of the battery 296 has continued over a certain time, the electronic device 201 may set the charge/discharge information of the battery 296 using the recharge time, the number of times of battery recharging, a variation amount of the battery voltage 410 or the like in the state in which the battery continues to be charged. For example, it is assumed that the fully charged state of the battery 296 has continued for 7 hours every night and the charge current at this time is 2 A and the charge voltage is 4.3 V. At night, since the user does not use the battery 296, the electronic device 101 may set the charge voltage 420 of the battery 296 to be a voltage lower than 4.3 V or set the charge current 421 to be a current lower than 2 A.

The electronic device 201 may charge or discharge the battery 296 based on the configured charge/discharge information in operation 505. When the charge voltage of the battery 296 is set to be 4.1 V, the electronic device 201 may charge the battery 296 up to 4.1 V. When the charge current of the battery 296 is set to be 1.8 A, the electronic device 201 may charge the battery 296 up to 1.8 A. When the charge time of the battery is set to be t, the electronic device 201 may charge the battery 296 for t hours. When the power-off voltage of the battery 296 is set to be 3.7 V, the electronic device 201 may discharge the battery 296 up to 3.7 V. FIG. 6A is a graph showing the changes in the battery voltage 610 based on time according to various embodiments of the present disclosure.

The electronic device 201 may perform various functions by consuming the battery voltage 610. The electronic device 201 may charge the battery voltage 610 up to the charge voltage 620 and discharge the battery voltage 610 up to the power-off voltage 630. When the charge voltage 620 of the battery 296 is set to be the fully charged voltage, the electronic device 201 may fully charge the battery 296. When the power-off voltage of the battery 296 is set to be the fully discharged voltage, the electronic device 201 may fully discharge the battery 296. The electronic device 201 may generate the usage pattern information of the battery 296 based on the time information. The electronic device 201 may configure the charge/discharge information of the battery 296 by using the usage pattern information of the battery 296, which is generated on the basis of the time information.

According to various embodiments of the present disclosure, the electronic device 201 may set the charge voltage 620 of the battery 296 using the usage pattern information generated on the basis of the time information. For example, when the electronic device 201 has a pattern that uses about 80% of the fully charged voltage every lunch time (between 12 and 13 o'clock), the electronic device 201 may acquire about 80% of the fully charged voltage, which is the battery consumption amount during lunchtime, as the charge voltage 620a of the battery 296. On the other hand, the electronic device 201 may acquire the charge voltage 620a having a certain range (80% to 90% of the fully charged voltage) by adding or subtracting an arbitrary value to or from the obtained charge voltage 620a. The electronic device 201 may set the obtained charge voltage 620a to be a charge voltage 620 during lunchtime. Further, as another example, when the electronic device 201 identifies a pattern that uses about 60% of the fully charged voltage after lunchtime, the electronic device 201 may acquire 60% of the fully charged voltage, which is the battery consumption amount after lunchtime, as the charge voltage 620b of the battery 296. On the other hand, the electronic device 201 may acquire the charge voltage 620b having a certain range (60% to 70% of the fully charged voltage) by adding or subtracting an arbitrary value to or from the obtained charge voltage 620b. The electronic device 201 may set the obtained charge voltage 620b to be a charge voltage 620 after lunchtime. Furthermore, as another example, when the electronic device 201 has a pattern in which it is connected to a Travel Charger and charges the battery 296 at night (for example, between 22 o'clock and 08 o'clock), the electronic device 201 may acquire the minimum battery consumption (for example, about 10% of the fully charged voltage) as the charge voltage 620c. The electronic device 201 may acquire the charge voltage 620c having a certain range (10% to 20% of the fully charged voltage) by adding or subtracting an arbitrary value to or from the obtained charge voltage 620c. The electronic device 201 may set the obtained charge voltage 620c to a charge voltage 620 at night. The electronic device 201 may charge the battery 296 up to the configured charging voltage 620a to 620c.

According to various embodiments of the present disclosure, the electronic device 201 may set the power-off voltage 630 of the battery 296 using the usage pattern information generated on the basis of the time information. For example, when the electronic device 201 has a pattern that does not use about 10% of the fully charged voltage every lunch time (between 12 and 13 o'clock), the electronic device 201 may acquire about 10% of the battery voltage which is not used at lunchtime as the power-off voltage 630a of the battery 296. On the other hand, the electronic device 201 may acquire the power-off voltage 630a having a certain range (5% to 10% of the fully charged voltage) by adding or subtracting an arbitrary value to or from the obtained power-off voltage 630a. The electronic device 201 may set the obtained power-off voltage 630a to be a power-off voltage 630 during lunchtime. Further, as another example, when the electronic device 201 identifies a pattern that does not use about 30% of the fully charged voltage after lunchtime, the electronic device 201 may acquire 30% of the battery voltage which is not used after lunchtime as the power-off voltage 630b of the battery 296. On the other hand, the electronic device 201 may acquire the power-off voltage 630 having a certain range (25% to 30% of the fully charged voltage) by adding or subtracting an arbitrary value to or from the obtained power-off voltage 630b. The electronic device 201 may set the obtained power-off voltage 630b to be the power-off voltage 630 after lunchtime. The electronic device 201 may discharge the battery 296 up to the configured power-off voltage 630a to 630b. When the charge voltage 620 of the battery 296 is set to be 80% of the fully charged voltage and the power-off voltage 630 of the battery 296 is set to be 20% of the fully charged voltage, the electronic device 201 may charge the battery 296 only up to 80% of the fully charged voltage and discharge the battery only up to 20% of the fully charged voltage. According to various embodiments of the present disclosure, it is needless to say that the electronic device 201 may set the charge current, charge time or the like of the battery 296 using the usage pattern information of the battery 296.

Figure 6B:
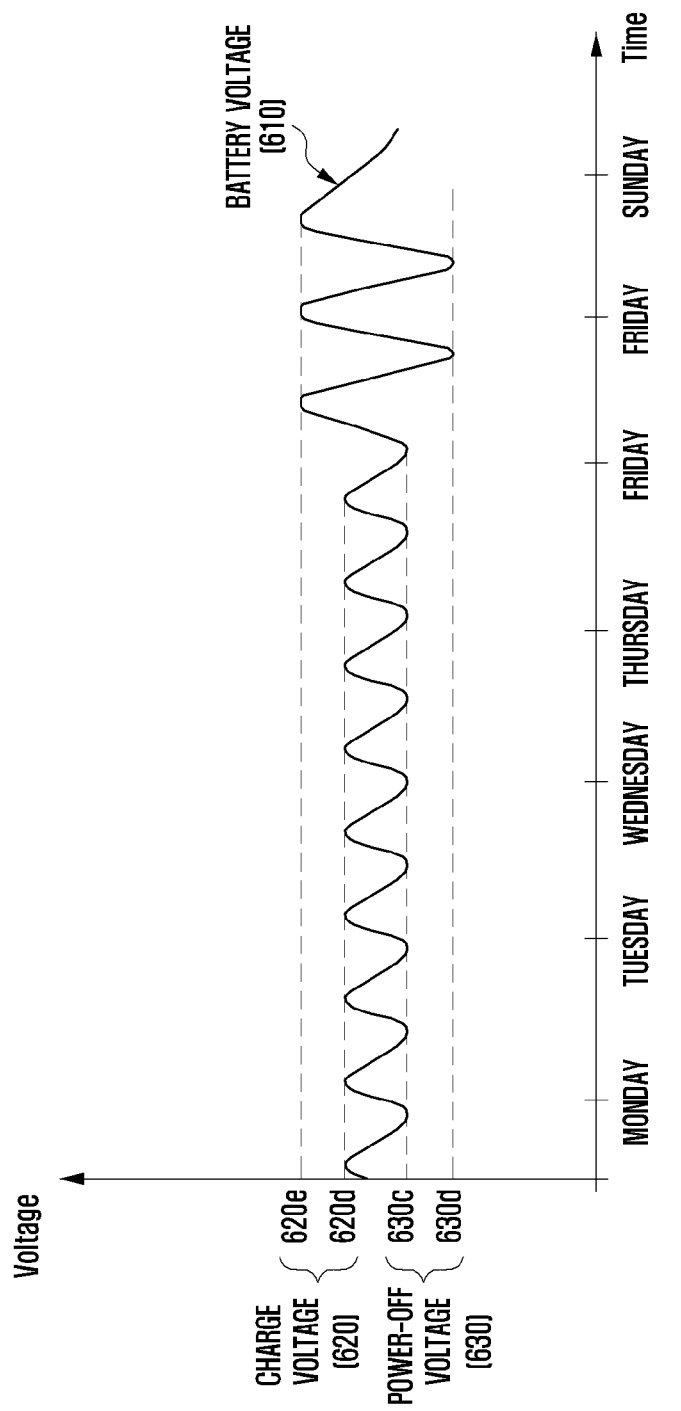
FIG. 6B is a graph showing changes in battery voltage based on days of the week according to various embodiments of the present disclosure.

FIG. 6B is a graph showing changes in the battery voltage 610 due to each day of the week according to various embodiments of the present disclosure. The electronic device 201 may generate usage pattern information of the battery 296 based on time information. The electronic device 201 may configure the charge/discharge information of the battery 296 using the usage pattern information of the battery 296, which is generated on the basis of the time information.

According to various embodiments of the present disclosure, the electronic device 201 may set the charge voltage 620 of the battery 296 using the usage pattern information of the battery 296 according to the days of the week. For example, when the electronic device 201 has a pattern that uses about 70% of the fully charged voltage on weekdays (for example, from Monday to Friday), the electronic device 201 may acquire about 70% of the fully charged voltage, which is the battery consumption amount on weekdays, as the charge voltage 620d. On the other hand, the electronic device 201 may acquire the charge voltage 620d having a certain range (70% to 80% of the fully charged voltage) by adding or subtracting an arbitrary value to or from the obtained charge voltage 620d. The electronic device 201 may set the obtained charge voltage as a charge voltage 620 on weekdays. For example, when the electronic device 201 has a pattern that uses about 85% of the fully charged voltage on weekends (for example, Saturday to Sunday), the electronic device 201 may acquire about 90% of the fully charged voltage, which is the battery consumption amount on weekends, as the charge voltage 620e. On the other hand, the electronic device 201 may acquire the charge voltage 620e having a certain range (85% to 95% of the fully charged voltage) by adding or subtracting an arbitrary value to or from the obtained charge voltage 620e. The electronic device 201 may set the obtained charge voltage as a charge voltage 620 on weekends. The electronic device 201 may charge the battery 296 up to the configured charging voltages 620d to 620e.

According to various embodiments of the present disclosure, the electronic device 201 may set the power-off voltage 630 of the battery 296 using the usage pattern information of the battery 296 according to the days of the week. For example, when the electronic device 201 has a pattern that does not use about 30% of the fully charged voltage on weekdays (for example, from Monday to Friday), the electronic device 201 may acquire about 30% of the battery voltage, which is not used on weekdays, as the power-off voltage 630c of the battery 296. On the other hand, the electronic device 201 may acquire the power-off voltage 630c having a certain range (25% to 30% of the fully charged voltage) by adding or subtracting an arbitrary value to or from the obtained power-off voltage 630c. The electronic device 201 may set the obtained power-off voltage 630c as the power-off voltage 630 on weekdays. Further, as another example, when the electronic device 201 identifies a pattern that does not use about 10% of the fully charged voltage on weekends, the electronic device 201 may acquire 10% of the battery voltage, which is not used on weekends, as the power-off voltage 630d of the battery 296. On the other hand, the electronic device 201 may acquire the power-off voltage 630d having a certain range (5% to 10% of the fully charged voltage) by adding or subtracting an arbitrary value to or from the obtained power-off voltage 630d. The electronic device 201 may set the obtained power-off voltage 630d as the power-off voltage 630 on weekends. The electronic device 201 may discharge the battery 296 up to the configured power-off voltages 630c to 630d. According to various embodiments of the present disclosure, it is needless to say that the electronic device 201 may set the charge current, the charge time or the like of the battery 296, using the usage pattern information of the battery 296.

Figure 6C:
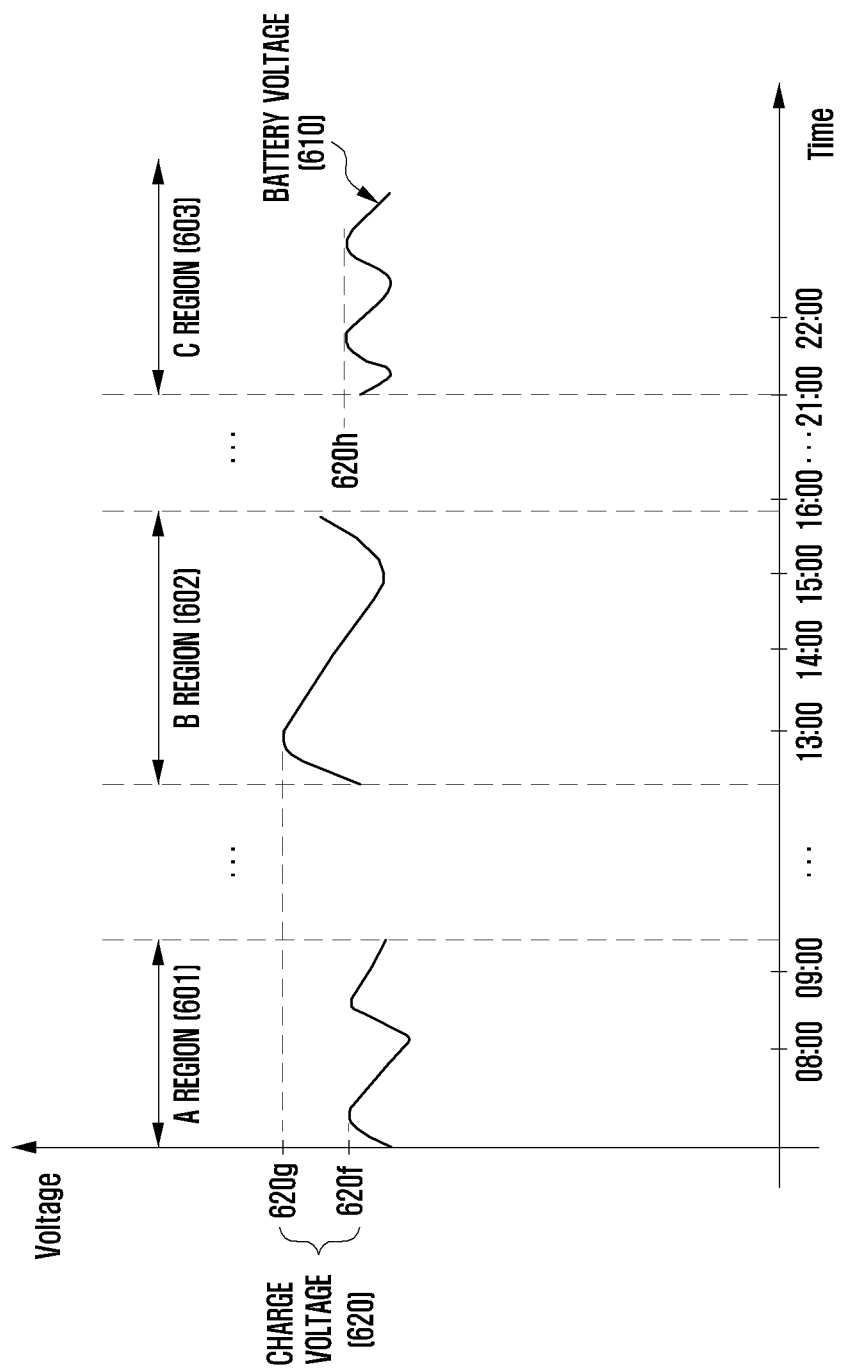
FIG. 6C is a graph showing changes in a battery voltage based on positions according to various embodiments of the present disclosure.

FIG. 6C is a graph showing a change in the battery voltage 610 based on positions according to various embodiments of the present disclosure.

The electronic device 201 may generate the usage pattern information of the battery 296 based on the location information. The electronic device 201 may configure the charge/discharge information of the battery 296 by using the usage pattern information of the battery 296, which is generated on the basis of the location information.

According to various embodiments of the present disclosure, the electronic device 201 may set the charge voltage 620 of the battery 296 using the usage pattern information of the battery 296 due to the position. For example, it is assumed that an A region 601 is the location where the user's workplace exists, a B region 602 is the location where the user went for the first time, and a C region 603 is the location where the user resides. In addition, it is assumed that the A region 601 and the C region 603 are places capable of easily charging the battery 296. When the electronic device 201 has a pattern that uses about 60% of the fully charged voltage while the electronic device 201 is located at the A region 601, the electronic device 201 may acquire, while located in the A region 601, about 60% of the fully charged voltage as the charge voltage 620*f*. On the other hand, the electronic device 201 may acquire the charge voltage 620*f* having a certain range (60% to 70% of the fully charged voltage) by adding or subtracting an arbitrary value to or from the obtained charge voltage 620*f*. The electronic device 201 may set the obtained charge voltage 620*f* as a charge voltage 620 at the A region 601. As an another example, when there is a schedule by which the electronic device 201 is located at the A region 601, is moved to the B region 602 having no usage pattern information on the battery at about 12:00 o'clock and is located at the B region 602 til about 16:00 o'clock, since the charging of the battery 296 may not be easy, the electronic device 201 may acquire, while it is located in the B region, the fully charged voltage as the charge voltage 620*g*. The electronic device 201 may set the obtained charge voltage 620*g* as the charge voltage 620 at the B region 602. On the other hand, the schedule of moving to the B region 602 is identified and the fully charged voltage can be acquired as the charge voltage 620*g* during charging before moving to the B region at the A region 601.

For an another example, when the electronic device 201 has a pattern that uses about 80% of the fully charged voltage, while it is located at the C region 603, the electronic device 201 may acquire about 80% of the fully charged voltage, while it is located at the C region 603, as the charge voltage 620*h*. On the other hand, the electronic device 201 may acquire the charge voltage 620*h* having a certain range (80% to 90% of the fully charged voltage) by adding or subtracting an arbitrary value to or from the obtained charge voltage 620*h*. The electronic device 201 may set the obtained charge voltage 620*h* as the charge voltage 620 at the C region 603. The electronic device 201 may charge the battery 296 up to the configured charge voltage 620*f* to 620*h*. According to various embodiments of the present disclosure, it is needless to say that the electronic device 201 may set, a charge current, a power-off voltage, a charge time or the like as well as the charge voltage 620 of the battery 296, using usage pattern information of the battery 296.

Figure 6D:
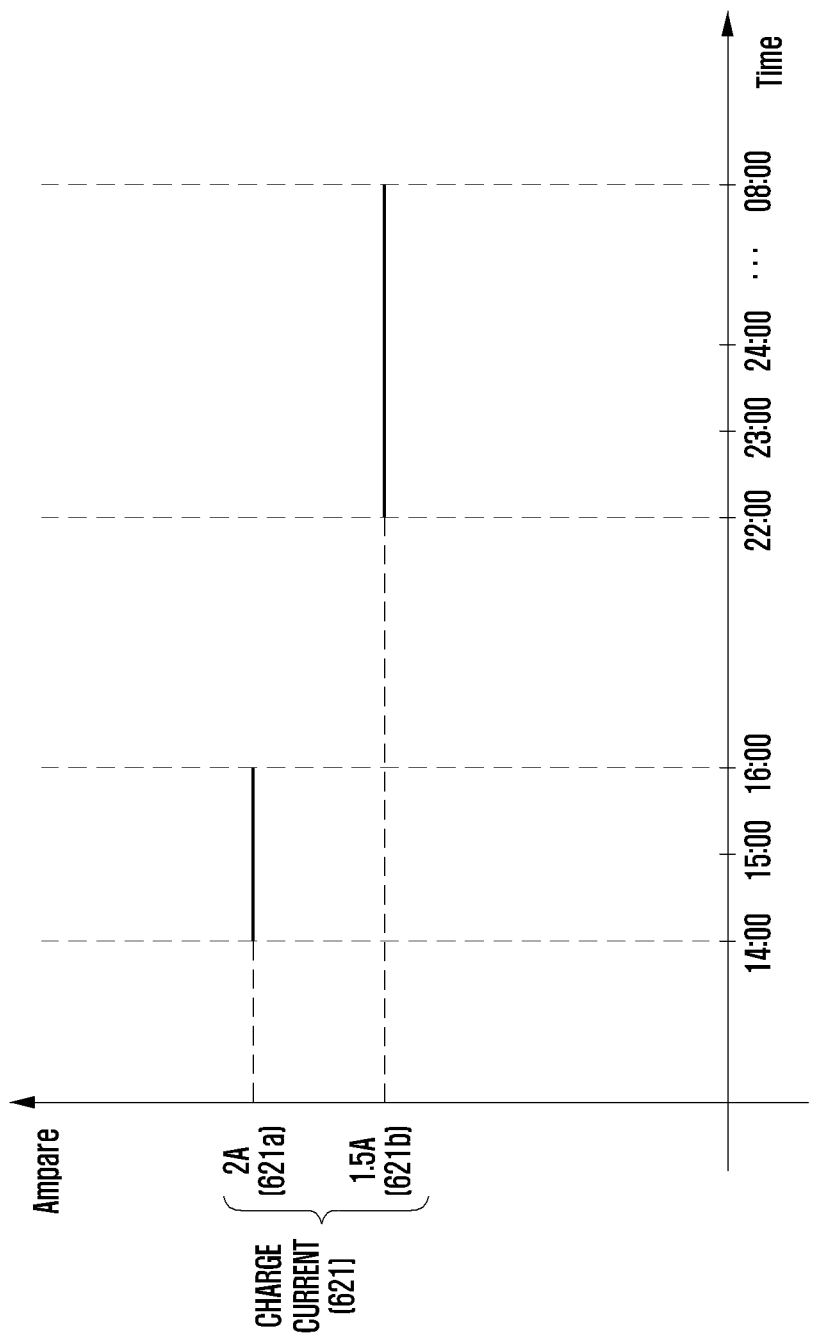
FIG. 6D is a graph showing changes in charging current of a battery based on time according to various embodiments of the present disclosure.

FIG. 6D is a graph showing changes in charging current of a battery depending on time according to various embodiments of the present disclosure. The electronic device 201 may analyze the state in which the battery 296 continues to be charged and generates the usage pattern information of the battery 296. The electronic device 201 may configure the charge/discharge information on the battery 296 using the usage pattern information of the generated battery 296. The electronic device 201 may configure the charge current 621 of the battery 296 using the usage pattern information generated by analyzing the state in which the battery 296 continues to be charged. For example, when the electronic device 201 has a pattern in which the charge state is maintained for up to 2 hours during the daytime, the electronic device 201 may set the charge current 621*a* of the battery 296 to 2 A. This is to increase the charging speed by increasing the charge current 621 because the state in which the battery continues to be charged is short during the daytime. For example, when the electronic device 201 has a pattern in which the charging state is maintained for up to 10 hours at night, the electronic device 201 may set the charge current 621*b* of the battery 296 to be 1.5 A. This is to slow down the charging rate by lowering the charge current 621 because the state in which the battery continues to be charged is long at night.

According to various embodiments of the present disclosure, when the charging state of the battery 296 continues after the charging of the battery 296 is completed based on the configured charge/discharge information, the state in which the battery 296 continues to be charged can be analyzed and the usage pattern information of the battery 296 can be generated. The electronic device 201 may re-configure the charge/discharge information of the battery 296 using the generated usage pattern information. For example, when having a pattern in which the battery 296 is fully charged up to the charge voltage every night and the fully charged state of the battery is maintained, the electronic device 201 may reconfigure the charge current, the charge voltage, and the charge time of the battery 296. It is assumed that the charge time is 30 minutes, the charge current is 2 A, and the charge voltage is 4.3 V. The electronic device 201 is connected to the travel charger and may charge the battery 296 up to the charge voltage (4.3 V) every night. When the battery voltage has reached the charge voltage 4.3 V and the fully charged state continues, the electronic device 201 may re-configure the charge voltage of the battery 296 to be 4.2 V in order to prevent deterioration of the battery 296. In addition, the electronic device 201 may reset the charge current of the battery 296 to be 1.8 A or reset the charge time of the battery 296 to be 60 minutes in order to prevent deterioration of the battery 296.

Figure 7:
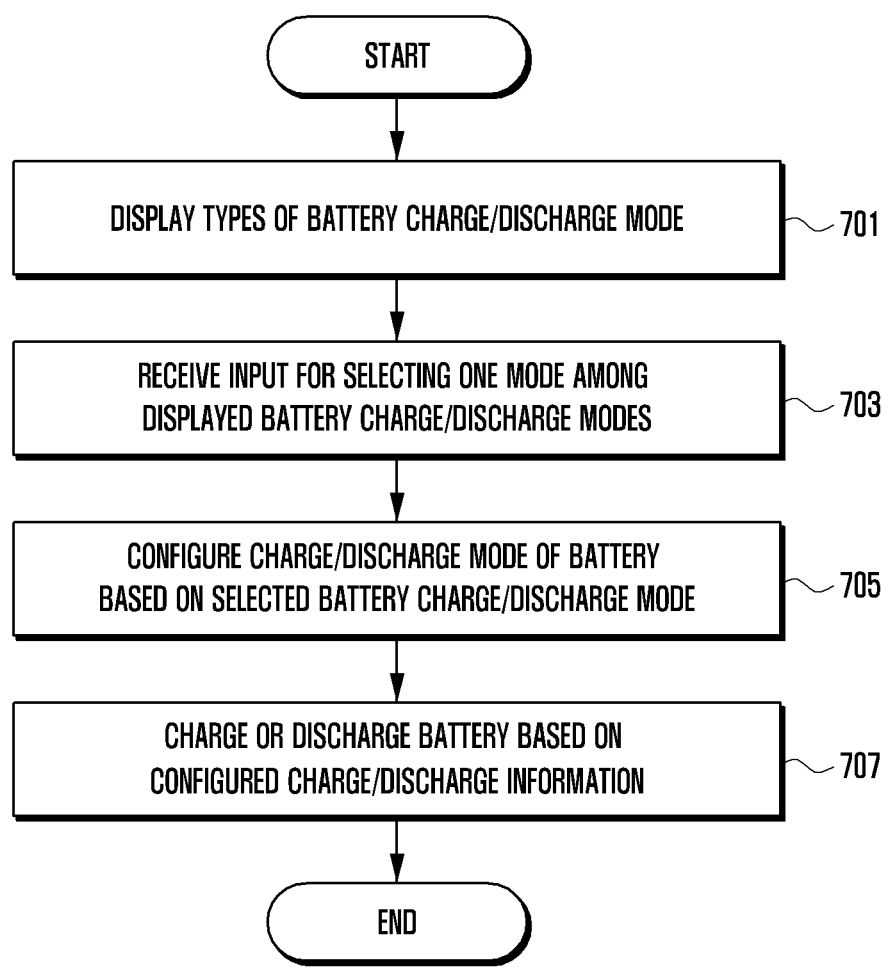
FIG. 7 is a flowchart showing an exemplary operation of selecting one charge/discharge mode among displayed battery charge/discharge modes and setting the charge/discharge information depending on the corresponding mode, according to various embodiments of the present disclosure.

FIG. 7 is a flowchart showing an operation of selecting one charge/discharge mode among displayed battery charge/discharge modes and setting the charge/discharge information depending on a corresponding mode, according to various embodiments of the present disclosure.

The electronic device 201, in operation 701, may display the type of battery charge/discharge mode. The type of battery charge/discharge mode may include a fully charged/discharged mode, a user configuration mode, and an automatic configuration mode.

The electronic device 201, in the operation 703, may receive an input for selecting one of the displayed battery charge/discharge modes. The electronic device 201 may receive the input via the input device 250, for example, a touch panel.

The electronic device 201 may configure, in operation 705, the charge/discharge information of the electronic device 201 based on the battery charge/discharge mode corresponding to the received input. When the electronic device 201 receives an input for entering the fully charged/discharged mode, the electronic device 201 may set the charge voltage to be a fully charged voltage or set the power-off voltage to be a fully discharged voltage.

According to various embodiments of the present disclosure, when the electronic device 201 receives an input for entering the user configuration mode, the electronic device 201 may receive, from a user, an input corresponding to the charge/discharge information that the user wants. For example, the electronic device 201 may receive an input corresponding to a charge voltage of 4.1 V from the user. According to various embodiments of the present disclosure, the electronic device 201 may receive information on the battery usage period that the user wants. According to various embodiments, the electronic device 201 may display, on the display 260, the number of charge/discharge cycles for which the battery 296 can be stably used, and may receive, through the input device 250, the number of charge/discharge cycles of the battery that the user wants. On the other hand, when assuming that the number of times of battery charging/discharging is calculated once daily, the electronic device 201 may display, on the display 260, the chargeable/dischargeable period capable of stably charging/discharging the battery 296 and may receive, from the input device 250, the battery charge and discharge period that the user wants. The electronic device 201 may receive the input through the input device 250, for example, a touch panel. When receiving the input corresponding to the charge voltage from the user, the electronic device 201 may set the charge voltage based on the input. The electronic device 201 may receive not only the charge voltage but also inputs corresponding to the charge current, the charge time, and the power-off voltage from the user. The electronic device 201 may set the charge/discharge information based on the input.

According to various embodiments of the present disclosure, when the electronic device 201 receives an input that enters the automatic configuration mode, as described with reference to FIG. 5, the electronic device 201 may generate the usage pattern information of the battery 296 based on the charge/discharge state of the battery 296. The electronic device 201 may configure the charge/discharge information of the battery 296 using the generated usage pattern information.

According to various embodiments of the present disclosure, the electronic device 201 may transmit the charge/discharge information corresponding to each of the charge and discharge modes via the communication module 220 to an external charging device. This is because the external charging device, by itself, may not generate the usage pattern information of the battery 296. The external charging device may charge the battery 296 based on the transmitted charge/discharge information.

The electronic device 201 may charge or discharge the battery 296 based on the configured charge/discharge information, in operation 707. For example, when the battery charge/discharge mode is the fully charged/discharge mode, the electronic device 201 may charge the battery 296 up to the fully charged voltage and discharge the battery 296 up to the fully discharged voltage. When the battery charge/discharge mode is a user configuration mode, the electronic device 201 may charge the battery 296 up to the charge voltage information obtained from the user and discharge the battery 296 up to the power-off voltage obtained from the user. The electronic device 201 may charge the battery 296 using the charge current obtained from the user. The electronic device 201 may charge the battery 296 based on the charge time obtained from the user. When the battery charge/discharge mode is the automatic configuration mode, the electronic device 201 may charge or discharge the battery 296 up to the charge voltage or the power-off voltage obtained based on the usage pattern information of the battery 296.

Figure 8:
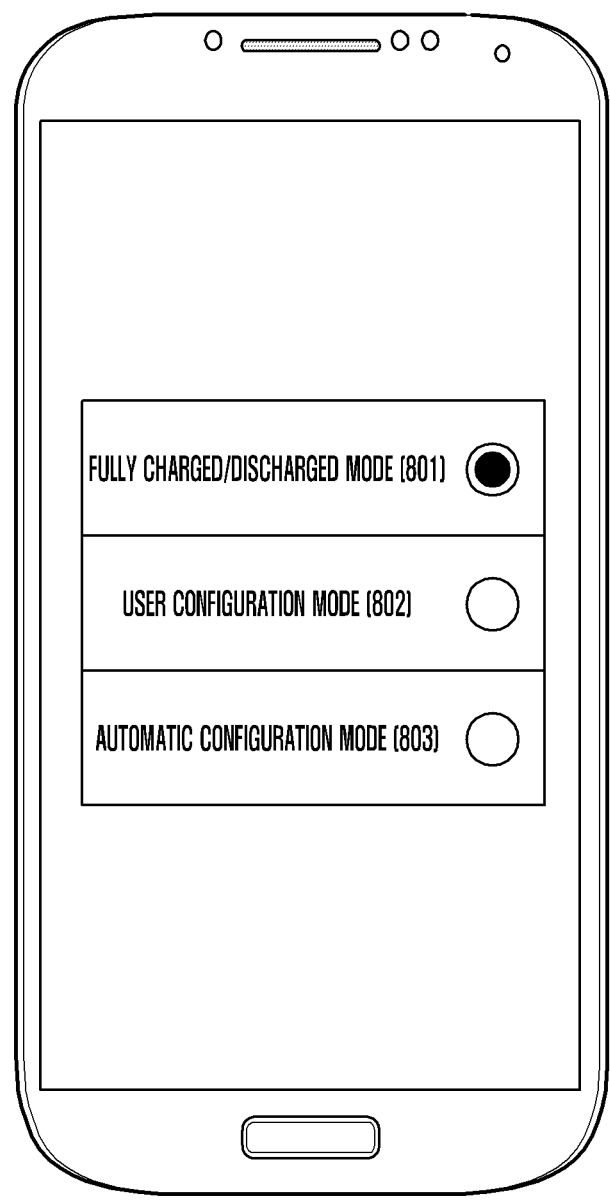
FIG. 8 is a diagram showing an electronic device for displaying different types of battery charge/discharge modes according to various embodiments of the present disclosure.

FIG. 8 is a diagram showing an electronic device for displaying types of the battery charge/discharge mode according to various embodiments of the present disclosure.

The electronic device 201 may display the type of battery charge/discharge mode via the display 260. The type of the charge mode of the battery may include the fully charged/discharged mode 801, a user configuration mode 802, and an automatic configuration mode 803. The fully charge/discharge mode may be a mode that configures the charge voltage of the battery 296 to be the fully charged voltage or a mode that configures the power-off voltage of the battery 296 to be the fully discharged value. When the user selects the fully charge/discharge mode 801, the electronic device 201 may charge the battery 296 up to the fully charged voltage or discharge the battery 296 up to the fully discharged voltage. The user configuration mode 802 may be a mode that configures the charge/discharge information of the battery 296 using the battery configuration information obtained from the user. The battery configuration information or battery charge/discharge information may include at least one type of information from among the charge voltage, the charge current, charge time, and the power-off voltage. The electronic device 201 may charge or discharge the battery 296 based on the configured charge/discharge information. In addition, the user configuration mode 802 may configure the charge/discharge information of the electronic device 201 to be a predetermined value. For example, in the case of a user configuration mode 802, the electronic device 201 may set the charge voltage to a predetermined voltage (e.g., 4.1 V) or set the power-off voltage to be a predetermined voltage (for example, 3.7 V), or set the charge current to be a predetermined current (for example, 2 A) without acquiring the charge/discharge information from the user. The predetermined charge/discharge information can be predetermined by the battery manufacturer in consideration of the battery usage period and the battery consumption amount. The automatic configuration mode 803 may be a mode that configures the charge/discharge information of the battery 296 using the usage pattern information of the battery 296. When the user selects the automatic configuration mode 803, the electronic device 201 may charge or discharge the battery 296 based on the configured charge/discharge information.

The apparatuses and methods of the disclosure can be implemented in hardware, and in part as firmware or via the execution of software or computer code in conjunction with hardware that is stored on a non-transitory machine readable medium such as a CD ROM, a RAM, a floppy disk, a hard disk, or a magneto-optical disk, or computer code downloaded over a network originally stored on a remote recording medium or a non-transitory machine readable medium and stored on a local non-transitory recording medium for execution by hardware such as a processor, so that the methods described herein are loaded into hardware such as a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc., that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. In addition, an artisan understands and appreciates that a "processor", "microprocessor", "controller", or "control unit" constitute hardware in the disclosure and appended claims that contain circuitry that is configured for operation. Under the broadest reasonable interpretation, the appended claims constitute statutory subject matter in compliance with 35 U.S.C. §101 and none of the elements are software per se. The term "module" as used in this application refers to the attachable structure of portions of the housing, and such components comprise statutory subject matter.

The definition of the term "unit" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

The embodiments disclosed in the present specifications and drawings were provided merely to readily describe and to help a thorough understanding of the present disclosure but not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. An electronic device comprising:
  a rechargeable battery; and
  at least one processor communicatively coupled to the battery,
  wherein the at least one processor generates usage pattern information of the battery based on a charge/discharge state of the battery and configures charge/discharge information of the battery based on the generated usage pattern information, and
  a non-transitory memory that stores the generated usage pattern information,
  wherein the at least one processor analyzes a battery consumption amount under one or more operating conditions of the electronic device in which at least one application is being executed on the electronic device and generates the usage pattern information of the battery associated with the execution of the at least one application.

2. The electronic device of claim 1, wherein the charge/discharge information comprises at least one type of information from among a charge voltage, a charge current, and a power-off voltage.

3. The electronic device of claim 1, wherein the at least one processor performs analyzing of at least one type of information from among a number of times of a battery charging/discharging is performed on the battery and a charging/discharging capacity of the battery, and generating the usage pattern information of the battery based on the analyzing of the at least one type of information.

4. The electronic device of claim 1, wherein the at least one processor generates the usage pattern information of the battery based on at least one of time information and location information of the electronic device.

5. The electronic device of claim 1, wherein the at least one processor analyzes a state in which the battery is being charged, and generates the usage pattern information of the battery based on the configured charge/discharge information from when the battery is being charged until the battery is completely charged.

6. The electronic device of claim 5, wherein the at least one processor re-configures the charge/discharge information of the battery using the generated usage pattern information.

7. The electronic device of claim 1, wherein the memory stores the usage pattern information of the battery and the charge/discharge information associated with one or more operating conditions of the electronic device.

8. The electronic device of claim 1, further comprising a power management module that is communicatively coupled to the at least one processor and charges or discharges the battery based on the configured charge/discharge information of the battery.

9. The electronic device of claim 1, further comprising a communication module including hardware that transmits the configured charge/discharge information of the battery to an external charge device.

10. The electronic device of claim 9, wherein the external charge device configures at least one of a charge voltage and a charge current of the battery based on the charge/discharge information of the battery received from the electronic device.

11. An electronic device comprising:
  a rechargeable battery;
  a display module including hardware that displays a charge/discharge mode of the battery;
  an input device that receives an input for configuring the displayed charge/discharge mode of the battery; and
  at least one processor that configures charge/discharge information of the battery based on the received input to set the charge/discharge mode of the battery,
  wherein in response to receiving a fully charged/discharged configuration mode input at a time the electronic device sets a charge/discharge mode of the battery, the at least one processor executes at least one among an operation of configuring a charge voltage of the battery to be a fully charged voltage or an operation of configuring a power-off voltage of the battery to be a fully discharged voltage.

12. The electronic device of claim 11, wherein in response to receiving an automatic configuration mode input at a time the electronic device sets the charge/discharge mode of the battery, the at least one processor generates usage pattern information of the battery based on a charge/discharge state of the battery and configures the charge/discharge information based on the usage pattern information.

13. The electronic device of claim 11, wherein in response to receiving a user configuration mode input at a time the electronic device sets a charge/discharge mode of the battery, the at least one processor configures the charge/discharge information of the battery using battery configuration information obtained from a user.

14. A method for controlling charge/discharge of a battery of an electronic device, the method comprising:
  generating, by at least one processor of an electronic device, usage pattern information of the battery based on a charge/discharge state of the battery, and
  configuring charge/discharge information of the battery based on the usage pattern information, wherein the generating the usage pattern information comprises:

analyzing a battery consumption amount of at least one application being executed on the electronic device and generating the usage pattern information of the battery based on execution of the at least one application.

15. The method of claim 14, wherein the charge/discharge information comprises at least one type of information from among a charge voltage, a charge current, and a power-off voltage.

16. The method of claim 14, wherein the generating the usage pattern information of the battery comprises:

analyzing at least one criterion from among a number of times of battery charging/discharging of the battery and a charging/discharging capacity of the battery and generating the usage pattern information of the battery.

17. The method of claim 14, wherein the generating the usage pattern information of the battery comprises:

generating the usage pattern information of the battery based on at least one criterion from among time information and location information.

18. The method of claim 14, wherein the generating the usage pattern information of the battery comprises:

analyzing a state in which the battery is being charged and generating the usage pattern information of the battery based on the configured charge/discharge information from when the battery is being charged until when the battery is completely charged.

19. The method of claim 18, further comprising re-configuring charge/discharge information of the battery using the generated usage pattern information.

20. The method of claim 14, further comprising storing the usage pattern information and the charge/discharge information in a non-transitory memory.

21. The method of claim 14, further comprising charging or discharging the battery based on the configured charge/discharge information.

22. The method of claim 14, further comprising transmitting the configured charge/discharge information to an external charge device.

23. A method for controlling charge/discharge of a battery, comprising:

receiving, by an electronic device, an input for configuring a charge/discharge mode of the battery; and configuring, by the electronic device, charge/discharge information of the battery based on the received input, wherein the configuring the charge/discharge information of the battery further comprises:

in response to receiving a user configuration mode input in the operation of receiving the input, configuring the charge/discharge information of the battery using battery configuration information obtained from a user.

24. The method of claim 23, wherein the configuring the charge/discharge information of the battery comprises:

when receiving the input comprises receiving an automatic configuration mode input, generating usage pattern information of the battery based on a charge/discharge state of the battery and configuring the charge/discharge information based on the usage pattern information.

25. The method of claim 23, wherein the configuring the charge/discharge information of the battery is based on at least one operation from among an operation of configuring a charge voltage of the battery to a fully charged voltage or an operation of configuring a power-off voltage of the battery to a fully discharged voltage, when receiving a fully charged/discharged configuration mode input in the operation of receiving the input.

26. An electronic device comprising:

a rechargeable battery; and at least one processor communicatively coupled to the battery, wherein the at least one processor generates usage pattern information of the battery based on a charge/discharge state of the battery and location of the electronic device and configures charge/discharge information of the battery based on the generated usage pattern information, and a non-transitory memory that stores the generated usage pattern information.

27. A method for controlling charge/discharge of a battery of an electronic device, the method comprising:

generating, by at least one processor of the electronic device, usage pattern information of the battery based on a charge/discharge state of the battery and location of the electronic device; and configuring charge/discharge information of the battery based on the usage pattern information.

* * * * *